United States Patent [19]
Muratani et al.

[11] Patent Number: 6,119,109
[45] Date of Patent: Sep. 12, 2000

[54] INFORMATION DISTRIBUTION SYSTEM AND BILLING SYSTEM USED FOR THE INFORMATION DISTRIBUTION SYSTEM

[75] Inventors: Hirofumi Muratani, Kawasaki; Tomohisa Hamakawa, Yokohama, both of Japan

[73] Assignee: Digital Vision Laboratories Corporation, Tokyo, Japan

[21] Appl. No.: 08/935,482

[22] Filed: Sep. 24, 1997

[30] Foreign Application Priority Data

| Sep. 30, 1996 | [JP] | Japan | 8-259433 |
| Dec. 25, 1996 | [JP] | Japan | 8-345971 |
| Feb. 28, 1997 | [JP] | Japan | 9-045541 |
| Mar. 14, 1997 | [JP] | Japan | 9-060406 |

[51] Int. Cl.$^7$ .................................................. G06F 17/60
[52] U.S. Cl. .......................... 705/400; 379/111; 379/114; 705/1; 705/30; 705/34; 705/418; 707/104
[58] Field of Search ................................. 377/13, 15, 16; 379/100.04, 111, 114; 705/1, 26, 27, 30, 34, 400, 418; 707/104

[56] References Cited

U.S. PATENT DOCUMENTS

| 3,917,934 | 11/1975 | Goto | 705/418 |
| 4,065,663 | 12/1977 | Edwards, II | 705/418 |
| 4,445,181 | 4/1984 | Yatman | 705/418 |
| 4,868,758 | 9/1989 | Kokubu | 705/400 |
| 5,212,644 | 5/1993 | Frisch | 705/418 |
| 5,412,575 | 5/1995 | Constant et al. | 705/400 |
| 5,412,806 | 5/1995 | Du et al. | 707/2 |
| 5,481,463 | 1/1996 | Constant et al. | 705/400 |
| 5,581,463 | 12/1996 | Constant et al. | 705/400 |
| 5,634,012 | 5/1997 | Stefik et al. | 705/39 |
| 5,729,740 | 3/1998 | Tsumra | 707/104 |
| 5,745,883 | 4/1998 | Krist et al. | 705/34 |
| 5,768,521 | 6/1998 | Dedrick | 395/200.54 |
| 5,771,289 | 6/1998 | Kuzma | 705/400 X |
| 5,825,883 | 10/1998 | Archibald et al. | 705/1 X |
| 5,852,812 | 12/1998 | Reeder | 705/34 X |
| 5,893,077 | 4/1999 | Griffin | 705/34 |
| 5,943,320 | 8/1999 | Weik et al. | 370/259 |
| 5,943,657 | 8/1999 | Freestone et al. | 705/400 |

*Primary Examiner*—Edward R. Cosimano
*Attorney, Agent, or Firm*—Christensen O'Connor Johnson & Kindness PLLC

[57] ABSTRACT

An information distribution system provides information requested from a user for the user through an information communication medium. The information distribution system comprises a billing processor which is individually from a data processor realized by an application program, the billing processor being realized by middle ware (an operating system). The information comprises a content, billing attribute data including a billing method and a settlement method, and correspondence information indicating the correspondence between the content and the billing attribute data. When a request is made from the user, the information distribution system retrieves the content which meets the request and transfers a request to the billing processor to perform the billing process. The billing processor uses the billing attribute data corresponding to the content to perform a predetermined billing process.

37 Claims, 18 Drawing Sheets

INFORMATION DISTRIBUTION SYSTEM AND BILLING SYSTEM USED FOR THE INFORMATION DISTRIBUTION SYSTEM

BACKGROUND OF THE INVENTION

The present invention relates to an information distribution system for distributing proprietary information, such as an image, for sale and a billing system used for the information distribution system.

This application is based on Japanese Patent Application No. 8-259433, filed Sep. 30, 1996, Japanese Patent Application No. 8-345971, filed Dec. 25, 1996, Japanese Patent Application No. 9-45541, filed Feb. 28, 1997 and Japanese Patent Application No. 9-60406, filed Mar. 14, 1997, the content of which is incorporated herein by reference.

In recent years, several information distribution systems are proposed which provides information as goods, which are electronic information, such as so-called multimedia information, for a user (a buyer of the goods) through a communication medium such as a computer network or a digital satellite broadcast or an information recording medium, such as a DVD (Digital Versatile Disk). For example, NTT proposed an information distribution system called FleaMarketm which uses the Internet as the communication media.

Multimedia information means information, such as a movie formed by combining image, audio and character (text) information items. Proprietary information include, in addition to the multimedia information, news information corresponding to an article of a newspaper or a magazine consisting of character information and still image information, information on a catalogue of goods and music composed of only audio information.

To realize an information distributing system, a so-called billing system for billing a user accurate charges (fees) is required when the information is provided and utilized. The billing system realizes a mechanism for paying the fees or charges to a provider of the information, a person having the copyright or a distributor of the information.

As compared with the usual provisions of products or goods, the provision of information has a variety of forms. Specifically, the information are in the form of an electronic file stored in a magnetic disk apparatus or an optical disk apparatus connected to a computer so as to be supplied to a computer of the user through an information recording medium or a communication medium. The information may be transformed into another shape, such as an image or voice which is a continuous analog information so as to be reproduced on a television receiver or a screen of a personal computer.

The charge of the proprietary information is determined in accordance with the information form and the provision form. If information is in the form of a file, the charge may be determined in unit of file or others (for example, in unit of byte) in accordance with the size of the file. Note that "the information in the form of a file" is information which exists on the provider side in the form of a file and which is downloaded or information which is continuously supplied so as to be stored in a file system of the user apparatus. If information is image information, such as a movie, the charge may be determined in unit of reproduction time (a period of time of usage) or unit of title (of the movie). In addition to uniform charge, a reduction rate may be introduced into the billing system, according to the usage time or the usage amount of information.

Some information are composed of a plurality of information contents. Specifically, there are information simultaneously providing an image and voice, the copyrights of which are owned by different persons, or information (corresponding to a virtual compact disk (CD)) formed by collecting music titles, the copyrights of which are owned by different persons. For a billing system adaptable to the above-mentioned complex information, a billing to a user results in processes for paying the charge to all persons having the copying corresponding to the contents. In this case, a provider of the information may pay the charge to each of the persons each having the copyright.

Moreover, the billing system must specify a charge settlement method in addition to the billing method (which means the methods of metering the charge in predetermined units) for proprietary information. Specifically, as a settlement method, a credit card, or a prepaid card, etc., are available now, and so-called electronics money will be available in future. The above-mentioned various settlement methods are adapted to the information according to the property of the contents and the method of providing information. It is preferable that a plurality of settlement methods be set to one information item to permit a user and the provider of the information to arbitrarily select a settlement method.

Since the information are provided in special and various forms as compared with usual goods and products, the persons having copyrights and the provider of the information must perform a complicated process of setting an arbitrary billing method and settlement method to perform a predetermined billing process. Moreover, a large quantity of process must be performed. As described above, the billing method includes a large number of forms, such as billing corresponding to the time in which the information (information provision) is given, billing corresponding to the quantity (bytes) of provided information and billing in a lump for a movie. At present, in an information distribution system, only one billing method determined by the provider of the information is employed. Specifically, a billing program is included in an application program installed on a user terminal or a server of the information provider. Therefore, change of the billing method requires rewriting of the application program and thus there arises a problem in that the billing method cannot easily be changed. Another problem arises in that a new billing method cannot easily be added and it is not permitted to select a billing method because the program must considerably be changed.

Since multimedia information providing services becomes popular in recent years, a case is increased in which one user makes a contract with a plurality of information providers to receive a plurality of information. In this case, the conventional billing function is implemented as a part of the application program. Therefore, when a new application program is produced, the billing function must be implemented in it. There arise problem in that an excessively long time is required to develop a billing program for each application program and the size of the program is enlarged and the structure of the program is complicated excessively.

For providing information, such as a movie or a music, having a real-time characteristic, a billing system of the foregoing type is usually performed such that the billing process is performed in a real-time manner in parallel to the process for providing information. Therefore, if plural information provisions are performed concurrently, the billing processes are performed concurrently too. Thus, there arises a problem in that the load of the billing process on the system becomes too heavy. In either of the time rate billing method or the byte rate billing method, the quantity of the billing process is enlarged if the unit (or rate) of billing is small. Therefore, the concentration of the billing processes caused from the enlargement of the billing process sometimes results in the load of the system being enlarged to exceed the allowable load. Thus, the normal billing process cannot be performed sometimes at worst. The reason why the billing process must be performed in a real-time manner is that the balance of an account of a bank or the permitted limit of a credit card has a possibility that it is changed because of use in response to another requirement. Therefore, a risk that the charge cannot be collected must be avoided and thus the real-time billing process must be performed.

It might be considered feasible to employ a job scheduling method (a method in which a job having a low priority is brought to a standby mode) of the operating system to adjust the operation of the system if the load of the computer system is made heavier. However, if the foregoing billing system employs the method in which a certain process is simply brought to the standby mode, generation of time delay raises the possibility of the fact that the valid billing process cannot be performed.

BRIEF SUMMARY OF THE INVENTION

Accordingly, a first object of the present invention is to provide an information distribution system which is capable of easily realizing a variety of billing methods and a billing system for use in the information distribution system.

A second object of the present invention is to provide an information distribution system which is capable of realizing an appropriate and efficient billing process to correspond to the contents of the information or the provision form and a billing system for use in the information distribution system.

A third object of the present invention is to provide an information distribution system which is required to simply prepare only another data processing function when another data processing is utilized and which is capable of eliminating a necessity of preparing an individual billing processing function and a billing system for use in the information distribution system.

A fourth object of the present invention is to provide a billing system which supervises a state of a load of a system when billing processes are concentrated during provision of information, such as a movie or music, having a real-time characteristic to enable a reliable billing process to always be performed under a proper load state and an information distribution system which uses the billing system.

According to the present invention, an information distribution system which is capable of realizing an appropriate and efficient billing process to correspond to the content of the information or the provision form and a billing system for use in the information distribution system can be formed.

According to the present invention, there can be provided an information distribution system which is required to simply prepare only another data processing function when another data processing is used and which is capable of eliminating a necessity of preparing an individual billing processing function and a billing system for use in the information distribution system.

According to the present invention, there can be provided a billing system which supervises a state of a load of a system when billing processes are concentrated during provision of information having a real-time characteristic, such as a movie or music, to enable a reliable billing process to always be performed under a proper load state and an information distribution system which uses the billing system.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of an information distribution system according to the present invention will now be described with reference to the accompanying drawings.

Figure 1:
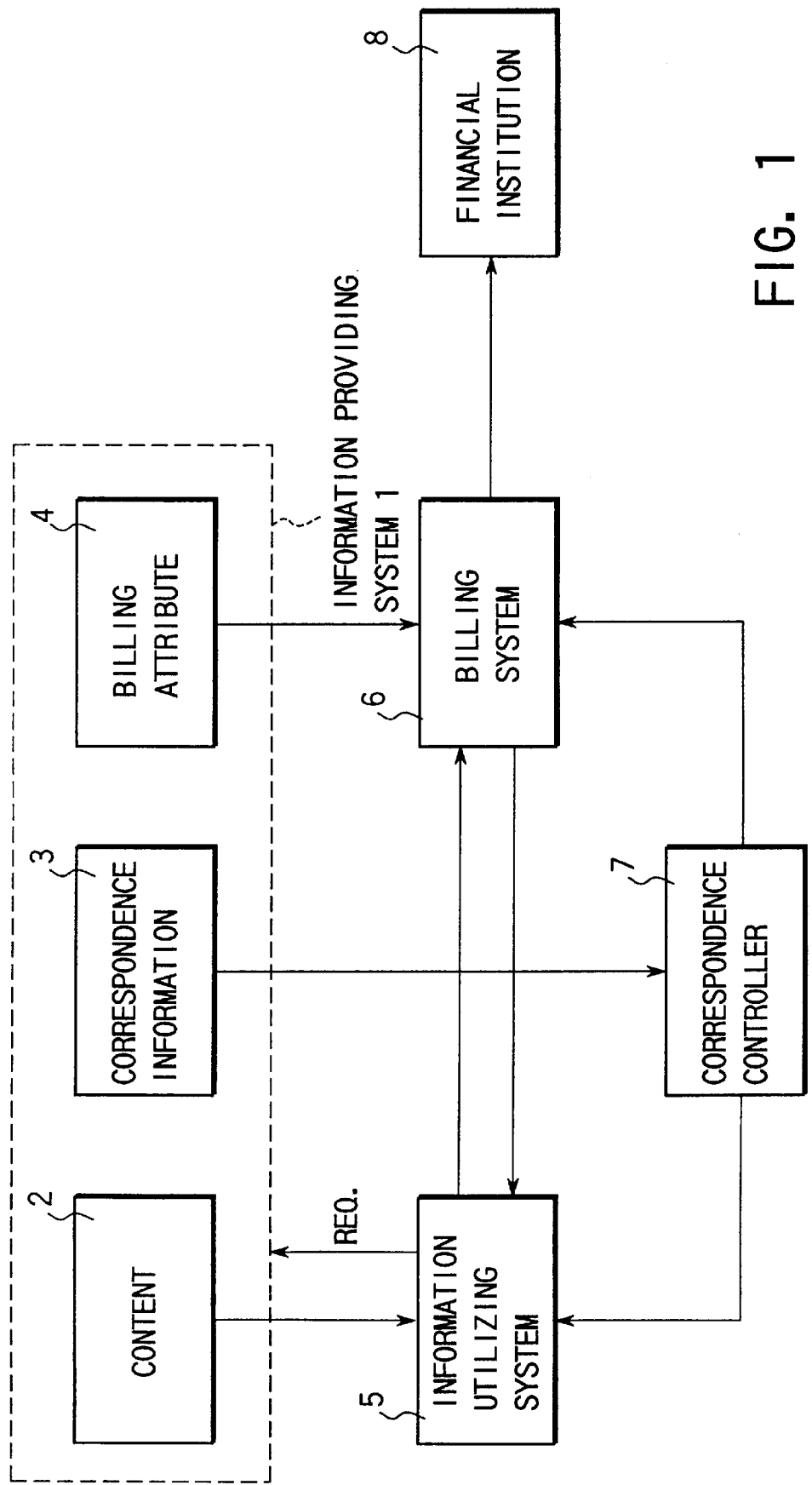
FIG. 1 is a schematic block diagram showing an information distribution system according to the present invention.

Referring to FIG. 1, the schematic structure of the information distribution system according to the present invention will now be described.

In the present invention, information which is provided as goods from an information provider (an information providing system) 1 comprises information itself (hereinafter called as "content") 2, billing attribute data 4 corresponding to the content 2, and correspondence information 3 showing the relationship between the content 2 and the billing attribute data 4.

The correspondence information 3 includes information indicating the location (address) of the corresponding billing attribute data 4 of the content 3, information indicating the location of the corresponding content 3 of the billing attribute data 4 and information indicating the locations of the corresponding billing attribute data 4 and the content 3. If a file system contains a content file, the file name of a file storing the billing attribute data of the content file can be regarded as information indicative of the location of the corresponding billing attribute data of the content. Similarly, if a file system contains a billing attribute file, the file name of a file storing the content file which can be utilized according to the billing attribute data can be regarded as information indicative of the location of the corresponding content of the billing attribute. If a file system contains a file storing a pair of a file name of a file storing a content and a file name of a file storing a corresponding billing attribute data of the content, the data of the file can be regarded as information indicative of the locations of the corresponding billing attribute data and the content.

Further, if a file contains billing attribute data and a content, information indicative of correspondence between the billing attribute data and the content can be regarded as offsets of the billing attribute data and content in the files. If the data structure is determined such that the offset has a fixed value, the information indicative of correspondence between the billing attribute data and the content are given by the data structure. For example, if the data structure is defined such that the first "n" bytes store the billing attribute data and the following bytes store the content, the offset value "n" is the information indicative of the correspondence between the billing attribute and the content. In this case, the value "n" does not depend on the content and the billing attribute data so that the information providing system 1 does not need the correspondence information 3 and it is not necessary to provide a correspondence controller 7.

Information may be provided in an on-line manner through a communication medium, such as a communication network or a digital satellite broadcast or in an off-line manner through an information recording medium, such as a DVD. The information providing system 1 provides information in response to an information provision request from a user. The content 2 is processed by an information utilizing system 5 of the user so as to be reproduced/used. The billing attribute data 4 is processed by a billing system 6 which may be provided for the user or the provider or which may exist independently so that billing (for example, a bill is sent to a financial institution 8 (subtracts from the account of the user)) of the information which is utilized by the user is performed. Correspondence information 3 for specifying the billing attribute data 4 which must be applied to the content 2, which is being processed by the information utilizing system 5, is supplied to a correspondence controller 7. As a result, when a certain content 2 is processed by the information utilizing system 5, the correspondence controller 7 is able to detect the billing attribute data which must be processed by the billing system 6. The billing system 6 can be used by another information utilizing system 5.

The information utilizing system 5 is realized by an application program, and realized as a platform which is different from the application program of the billing system 6. The application program comprises means for detecting a timing for performing a data process required to perform the billing process and means for supplying detected timing data to the platform. The platform comprises means for performing a billing process in accordance with the timing data. The platform is formed of a plurality of modules for realizing a plurality of billing functions having various forms and means for selecting a billing function from the plural billing functions in accordance with the billing attribute data.

As described above, the present invention in which the billing function is made to be independent from the application program which is the data processing function, is able to easily realize various billing methods. Thus, the system according to the present invention is adaptable to easily change in the billing method. Since a plurality of data processing functions are able to share the same billing function, a necessity of preparing another billing function when another application program is used can be eliminated. Since another data processing function is required to be prepared simply, an application program can easily be developed. That is, the necessity of preparing a billing program for each application program can be eliminated. Thus, time required to develop an application program can be shortened and the problem of the enlargement of the program size and complexity of the program can be overcome.

Embodiments of the information distribution system according to the present invention will now be described.

First Embodiment

Initially, definition of terms is described. In this specification, "billing" means actions including "contract", "sending bill" and "settlement" which are performed when an information is provided/received between an information provider and a user. The term "contract" is an action of agreement between an information provider and a user including the condition under which the information is provided. Note that "contract" includes an action which is performed if a breach of contract is performed. The term "sending bill" is an action of billing a charge including a fee which must be paid for the provision of the information under the condition determined when the contract is made. The term "settlement" is an action of paying/receiving money requested to be paid between the information provider and the user. In order to clarify the border between "sending bill" and "settlement", an action for notifying an institute, such as a bank or a credit card company, which performs a settlement of a sum is included in "sending bill". on the other hand, updating of available balance of a prepaid card or account is a portion of the "settlement".

Figure 2:
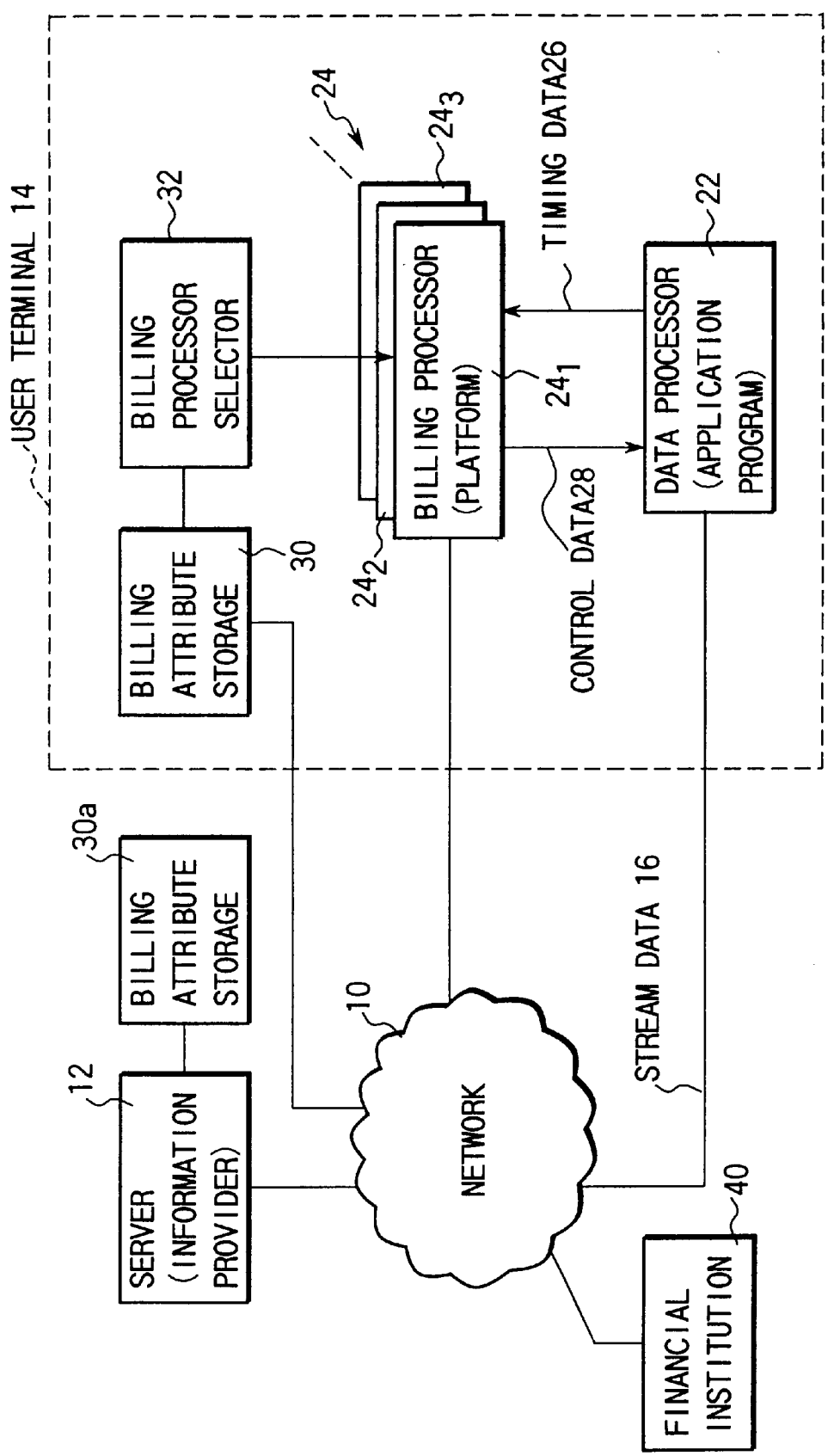
FIG. 2 is a block diagram showing a first embodiment of the information distribution system according to the present invention.

FIG. 2 is a block diagram of the information distribution system according to the first embodiment showing the detailed structure of a user terminal. Although the billing processor can be independently provided as shown in FIG. 1, the billing processor of the first embodiment is provided in the user terminal. A server 12 of an information provider and an user terminal 14 of a user of information are connected to a computer network 10. Although a plurality of servers 12 and terminals 14 exists in general, only one of the servers 12 and one of the terminals 14 are illustrated for the purpose of simplifying the description. The server 12 supplies stream data 16 to the terminal 14 through the computer network 10 in response to a request from the terminal 14. The stream data 16 may be digital data, such as an image, voice or text data or multimedia data composed of the foregoing data. Also the image may be a moving image or a still image. In this embodiment, the server 12 provides image information. Stream data 16 is encoded to inhibit use of user except for the contracted person. Since the user is notified of a decoding key when the user makes a contract, the user is able to decode supplied data which is encoded to use/process the same.

In the user terminal 14, stream data 16 is supplied to a data processor 22. The data processor 22 executes an application program (a so-called software) for reproducing (decoding) stream data 16 and displaying the same. Although omitted from illustration, a display unit serving as an image reproducing portion and a loud speaker unit or the like serving as an audio-data reproducing portion are connected to the data processor 22. The data processor 22 also performs an authentication whether or not the user is an authorized person.

This embodiment is characterized in that the billing function is separated from the data processor 22 to make this as a billing processor 24 and to realize the billing processor 24 as a platform (specifically which is realized as a middle ware, or a function of an operating system). Since the billing function to be simply independent from the data processing function is insufficient for the billing function to obtain information about the program which is being processed by the data processor 22 to perform the billing process, the data processor 22 comprises means for detecting a timing at which the billing process must be performed, for example, start/end of utilization of data. The data processor 22 transmits detected timing data 26 to the billing processor 24. In accordance with the timing data 26, the billing processor 24 performs the billing process and transmits control data 28 for limiting and controlling utilization of data in accordance with the billing state (the balance in the user's account). Specifically, the billing processor 24 calculates the charge of the information provision (utilization of data) and transmits a result of the calculation to a financial institution 40 so that a bill is sent. Therefore, also the billing processor 24 is connected to the computer network 10 to communicate the amount of the bill and the balance of the account with a billing server (not shown).

Since a plurality of billing methods are considered, for example, billing corresponding to time for providing information, billing corresponding to the quantity of information or collective billing for each movie, the billing processor 24 is composed of modules $24_1, 24_2, 24_3, \ldots$, to permits a billing processor selector 32 to select an optimum billing method based on billing attribute data. The billing attribute data is generally determined for each information (information as goods) by the information provider 12. Note that the billing attribute includes a settlement method as well as the billing method. The billing attribute data is supplied from the server 12 through the computer network 10. Therefore, a billing attribute storage 30a is connected to also the information provider 12.

An exemplification process will now be described in which a billing method corresponding to the quantity of data is selected and the billing attribute data recites this billing method. A billing processor 24 for the billing method corresponding to the quantity of data is selected. The selected billing processor 24 obtains time for which data is utilized in accordance with data utilization start timing and utilization completion timing supplied from the data processor 22. Then, the billing processor 24 multiplies the obtained time with a data transmission rate to obtain the quantity of data, and then multiplies the quantity of data with a predetermined charge rate according to the billing attribute so that a charge is obtained. The charge is transmitted to the server of the financial institution 40 through the computer network 10 so that the charge is subtracted from the account of the user. When the billing method is attempted to be changed, the information provider 12 is required to simply change the billing attribute in the billing attribute storage 30a to select another billing processor suitable for the changed billing attribute. Thus, the data processor 22 is not needed to be changed.

As described above, according to this embodiment, a system can be provided which is capable of easily realizing a billing method requested by the information provider or the user and which is flexibly adaptable to a plurality of billing methods. For example, the billing attribute data includes plural billing attribute data, such as one dollar per hour and five dollars per one day. The user can select either the billing attribute data based on his or her desire.

Since each billing function is formed into the module, the billing program can easily be changed and/or added. Since the billing processor is formed into the platform, one billing processor can be shared by a plurality of application programs.

Other embodiments of the information distribution system according to the present invention will be described. The same portions as those of the first embodiment will be indicated in the same reference numerals and their detailed description will be omitted.

Second Embodiment

Figure 3:
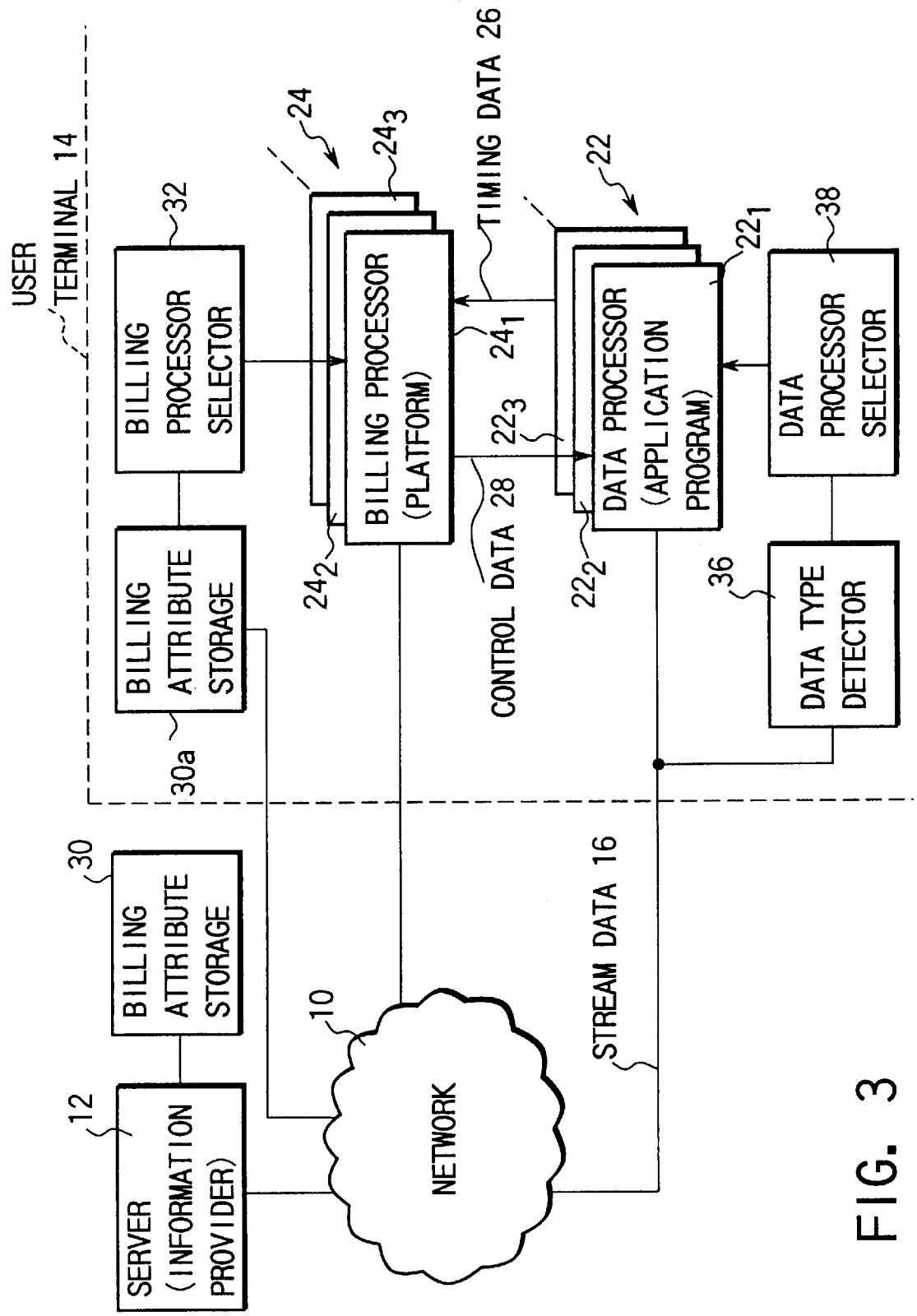
FIG. 3 is a block diagram showing a second embodiment of the information distribution system according to the present invention.

FIG. 3 is a block diagram showing a structure in which the data processor 22 according to the first embodiment is, similarly to the billing processor 24, provided for each of a plurality of data processing schemes. It is preferable that a plurality of stream data items 16 of different types, such as images and texts, are transmitted to the computer network 10 and can be used/processed by one user terminal 14. If the type or the format of data is different, a different data processing program must be prepared. Accordingly, the data processor 22 is composed of modules $22_1, 22_2, 22_3, \ldots$, for realizing different data processing schemes to permit a data processor selector 38 to select a required data processing scheme to be adaptable to the type of data detected by the data type detector 36. Since the data process (for example, the decoding process) suitable for each information provider is considered to be different as well as the difference in the type of data, such as the image and text, the data type detector 36 detects the data type including the foregoing difference.

Similarly to the first embodiment, the billing processor 24 is realized as a platform which is independent from the data processor 22. Thus, the billing processor 24 is able to perform the billing process in accordance with timing data 26 supplied from the data processor 22. Therefore, even if the data processor 22, which is the application program, is changed or added, the billing processor 24 is not needed to be changed or added. Thus, the same billing processor 24 can be shared by the plural data processing modules $22_1$, $22_2$, $22_3$, . . . . That is, when another application program is used, another billing function is not needed to be prepared individually and another data processing function is merely needed to be prepared. Thus, the application program can easily be developed.

Since the billing processor 24 is composed of the modules $24_1$, $24_2$, $24_3$, . . . , capable of individually billing methods similarly to the first embodiment, a required billing method can be selected by the billing processor selector 32 in accordance with the billing attribute data 30. Therefore, a very large number of billing methods can be applied to a very large number of data processing schemes. Thus, a flexible system can be formed.

Although the billing processor 24 is provided for the user terminal 14 in the first and second embodiments, it may be provided for the server 12 of the information provider. If the billing processor 24 is provided for the server 12, the billing processor 24 and the data processor 22 are required to be connected to each other through the computer network 10. As described with reference to FIG. 1, the billing processor 24 may be provided independently from each of the user terminal 14 and the server 12 of the information provider. In the first and second embodiments, it is not always necessary to make the billing processor 24 by using the plural modules. The billing processor 24 is merely required to be independent from the data processor 22 (which is data processing modules $22_1$, $22_2$, $22_3$, . . . , in the second embodiment).

Third Embodiment

Figure 4:
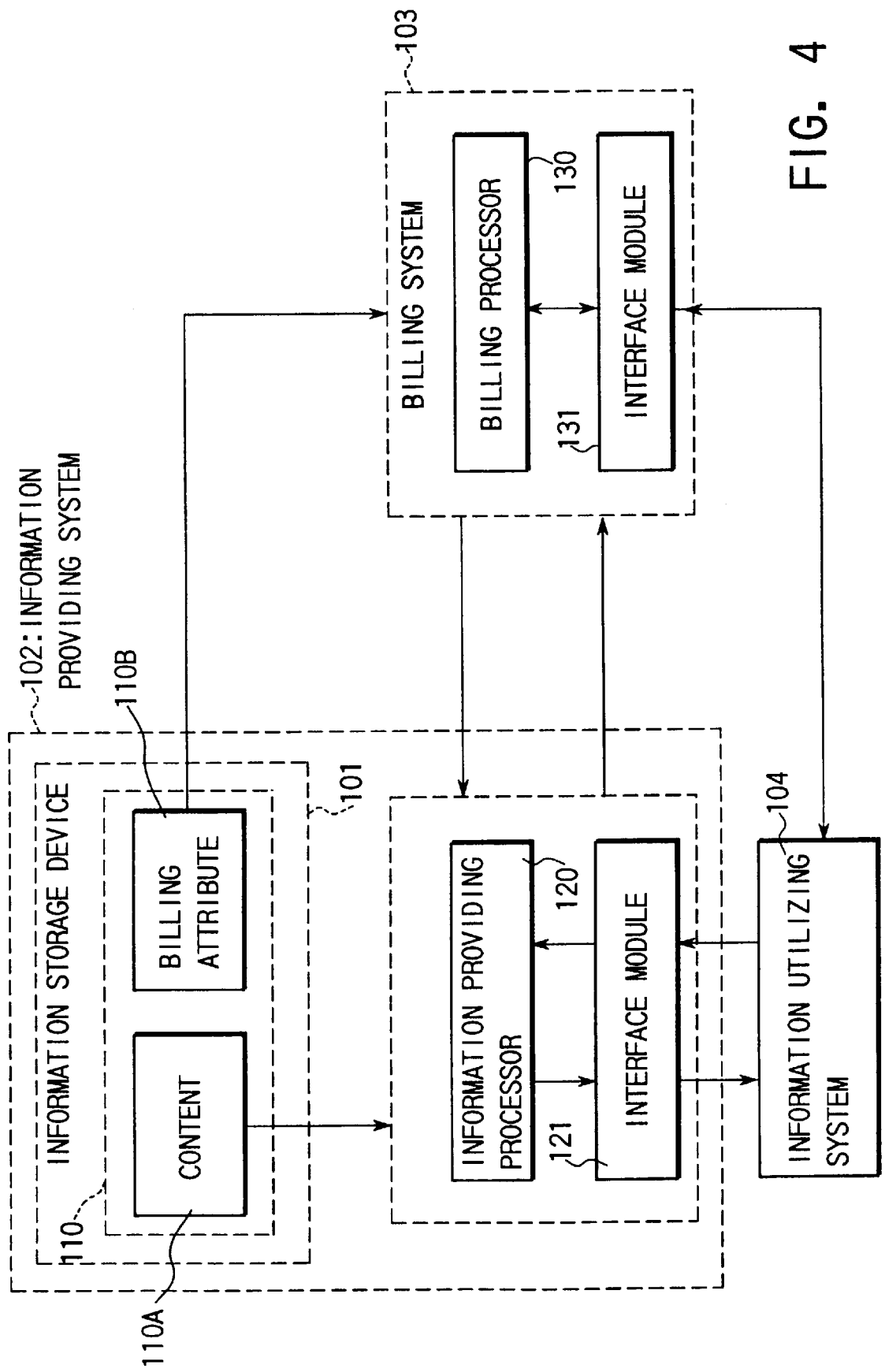
FIG. 4 is a block diagram showing an information providing system of a third embodiment of the information distribution system according to the present invention.
Figure 5:
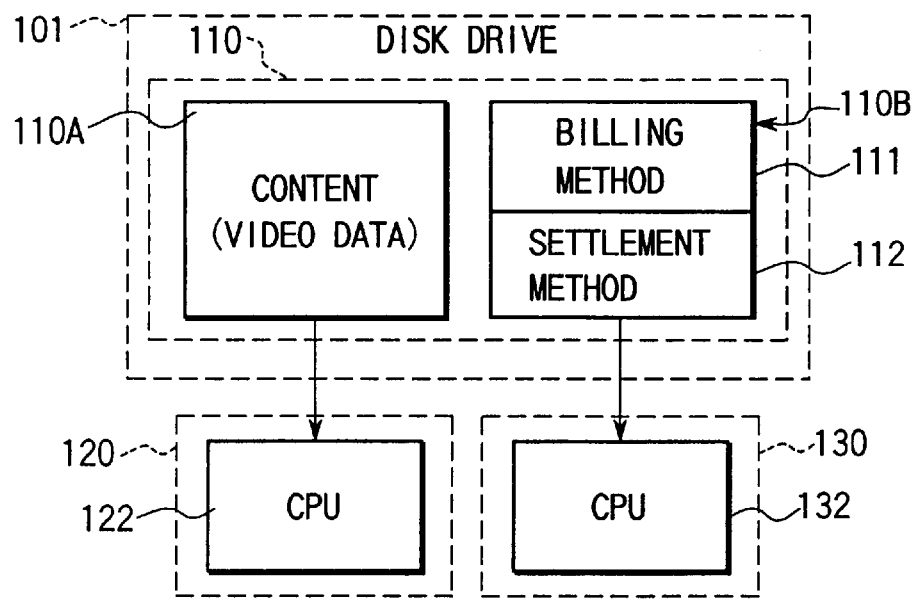
FIG. 5 is a detailed block diagram showing an information storage according to the third embodiment.
Figure 6:
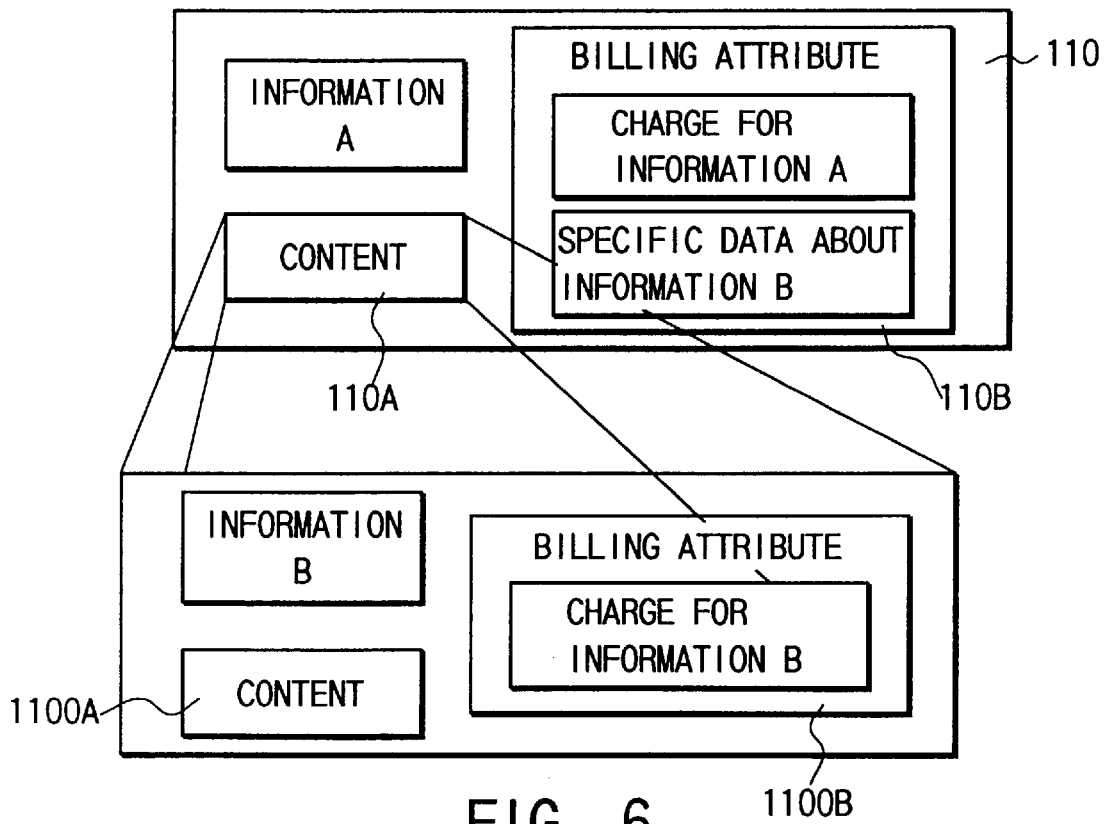
FIG. 6 is a block diagram showing an example of information as goods according to the third embodiment.
Figure 7:
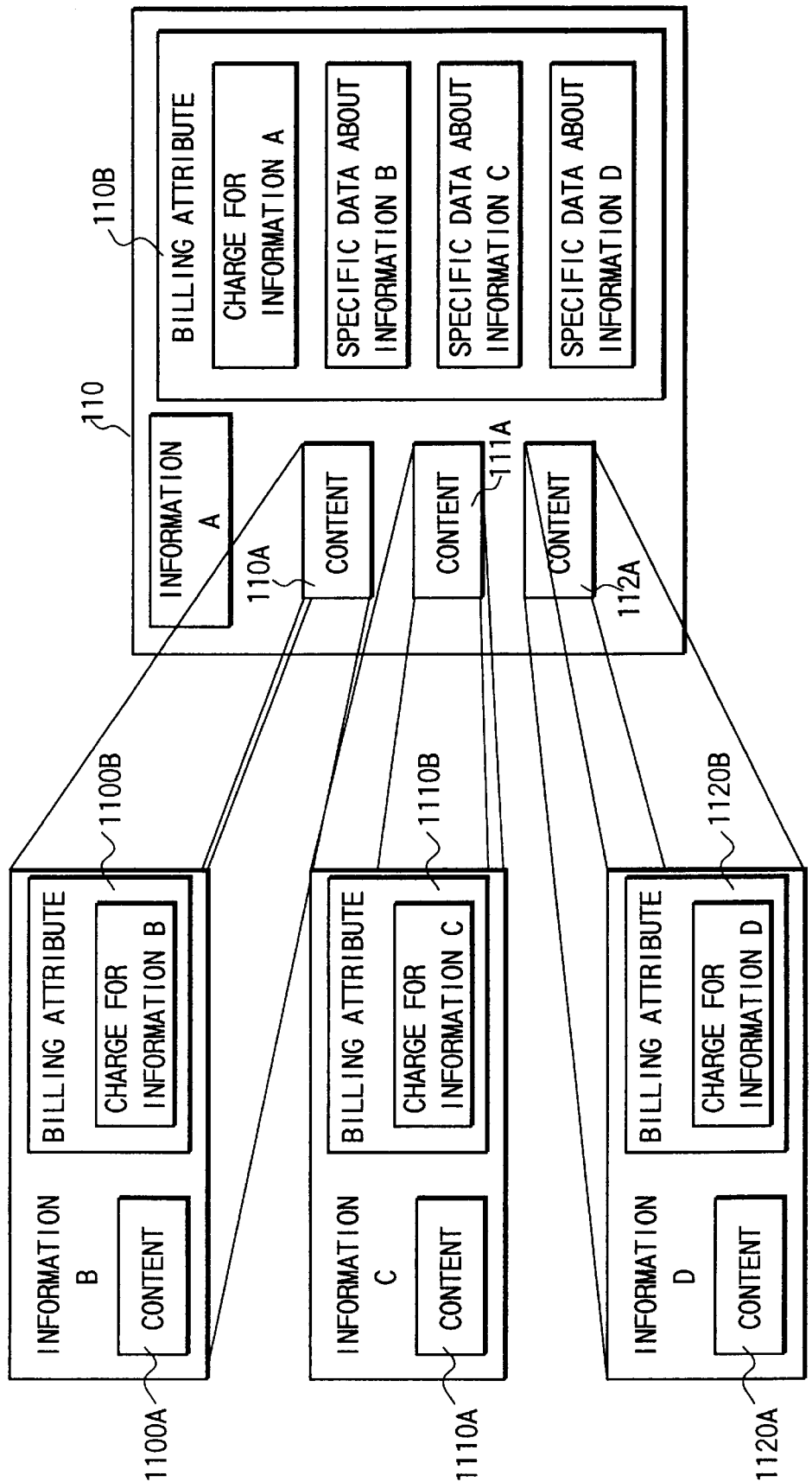
FIG. 7 is a block diagram showing another example of the information as goods according to the third embodiment.
Figure 8:
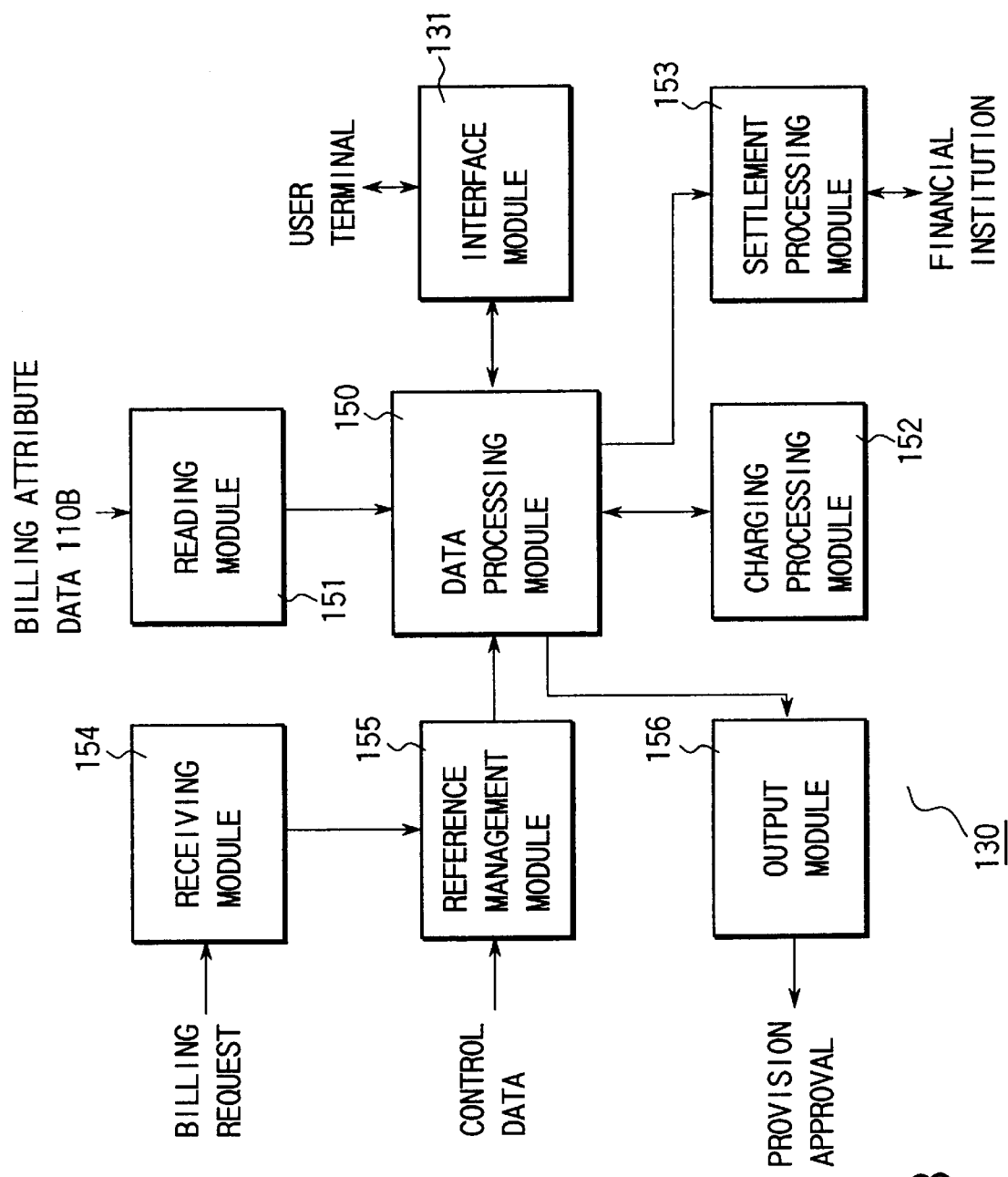
FIG. 8 is a block diagram showing an example of a billing system according to the third embodiment.
Figure 9:
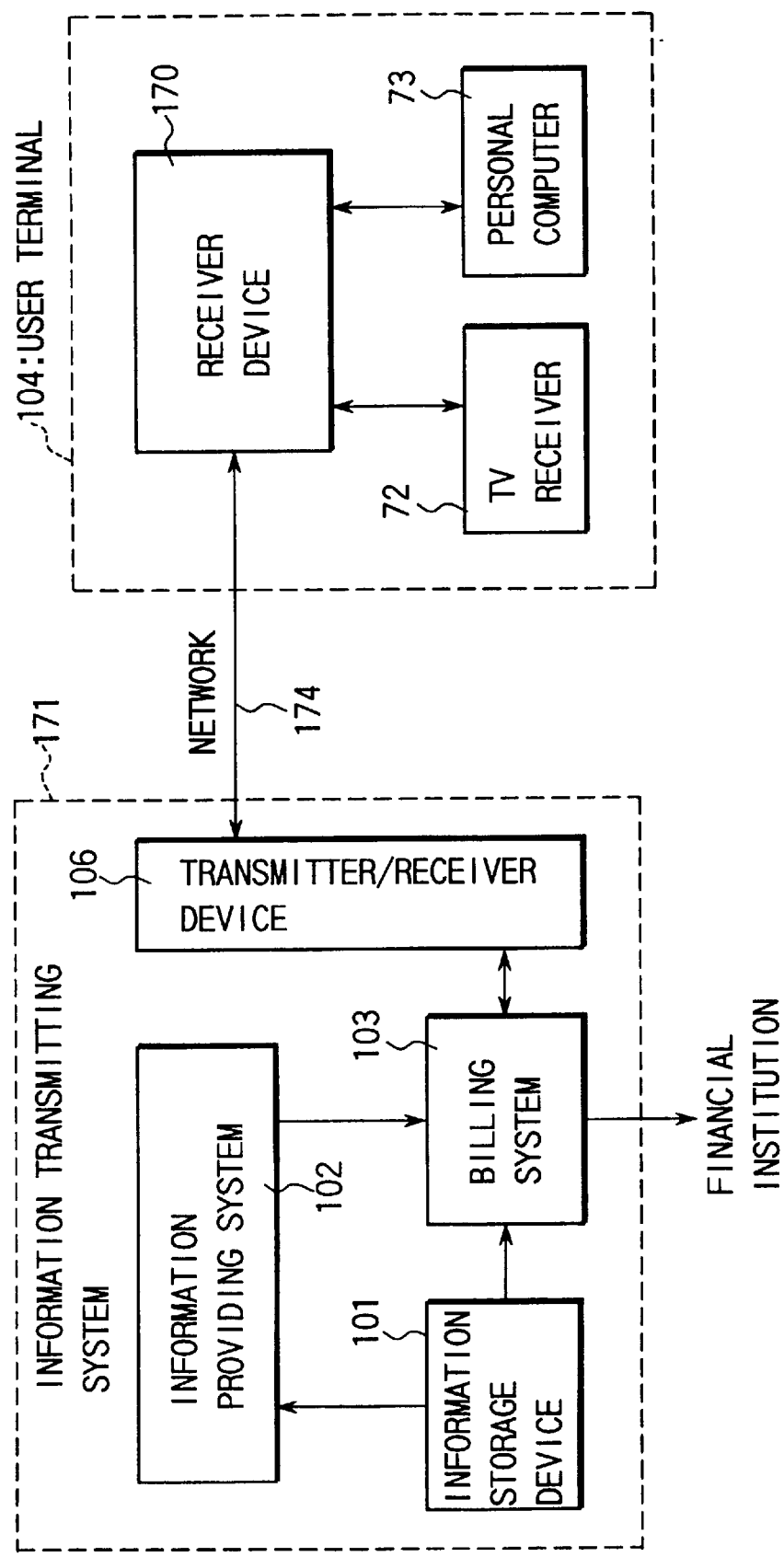
FIG. 9 is a block diagram showing the overall information distribution system including the information providing system shown in FIG. 4.
Figure 10:
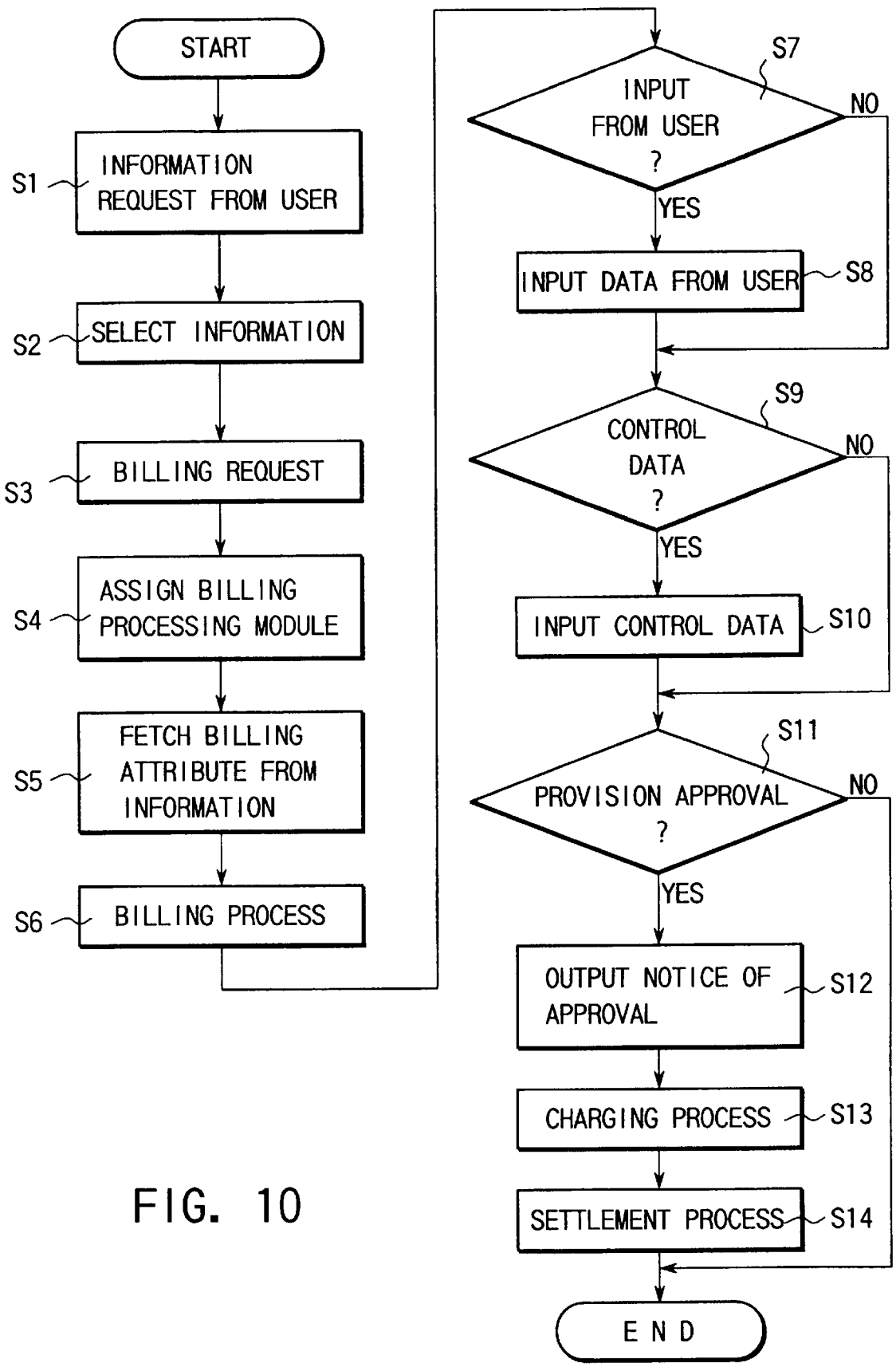
FIG. 10 is a flow chart showing the operation of the third embodiment according to the present invention.

FIG. 4 is a block diagram showing the structure of an information providing system of a third embodiment of an information distribution system according to the present invention. FIGS. 5, 6 and 7 are block diagrams showing the structure of information as goods according to this embodiment. FIG. 8 is a block diagram showing a billing system according to this embodiment. FIG. 9 is a block diagram showing the information distribution system according to the third embodiment. FIG. 10 is a flow chart showing the operation of this embodiment.

(Structure of System)

The information distribution system according to this embodiment uses a computer system and a communication medium, such as computer communication network or a digital broadcast network (including a satellite broadcast, a satellite communication and a cable television) to provide pay information for a user as goods in response to a request from the user. Provision of information may be performed through a storage medium, such as a DVD, in stead of the communication medium.

The system according to this embodiment, as shown in FIG. 4, comprises an information providing system 102, a billing system 103 and an information utilizing system 104 for utilizing information. The information providing system 102 comprises an information storage device 101. The information storage device 101 is a storage device (which is generally a large-capacity file apparatus) for storing information 110 which is provided as goods. As described later, the information storage device 101 can be read by the information providing system 102 and the billing system 103 each comprising a computer. Also in this embodiment, the billing system 103 is realized as a platform by a middle ware or a function of operating system which is individually from the application program which is executed by the information utilizing system 104.

The information 110 according to this embodiment comprise pay content data (hereinafter simply called as a "content") 110A which is utilized by the user and billing attribute data 110B corresponding to the content 110A. Specifically, the content 110A is multimedia information (information in the form of combination of an image and voice) news information (for example, an electronic newspaper) composed of character information and still images and book information (a so-called electronic book) mainly composed of character information. The billing attribute data 110B is information with which the billing process is performed when the content 110A is provided to a user, the billing attribute data 110B being composed of billing method data and settlement method data as described later.

The information providing system 102 is communication means for communicating information with the information utilizing system 104 and the billing system 103, the information providing system 102 being composed of an information providing processor 120 and an interface module 121. The information providing processor 120 is a main component of the information distribution system comprising hardware and software of a computer system, the information providing processor 120 having a function for controlling a process for providing the content 110A in response to the request from a user and the billing process. The interface module 121 is an input/output interface for performing a process of communicating information between the information providing processor 120 and the information utilizing system 104.

The information utilizing system 104 is a personal computer having a communication function or an information receiving apparatus having a television receiver arranged to be operated by a user. The information utilizing system 104 has an input device (a keyboard or a mouse) which is operated when provision of information is requested or a request is made to the billing system 103 to perform the billing process, a display unit for reproducing the content 110A and a printing apparatus. The information utilizing system 104 further comprises a filing apparatus, such as a hard disk drive, for downloading information in the form of a file or software.

The billing system 103 comprises a billing processor 130 composed of hardware and software of the computer system and an interface module 131 for communicating information with the information utilizing system 104. As described later, the billing processor 130 is composed of a plurality of modules to perform various billing processes in response to a request from the information providing system 102 by reading the billing attribute data 110B from the information storage device 101 (refer to FIGS. 8 and 10).

(Structure of Information to be provided as goods)

As shown in FIG. 5, the information 110 are stored in the information storage device 101 comprising a disk drive, for example, a hard disk drive or an optical disk drive. The information 110 comprise the content 110A, such as image information, and billing attribute data 110B. The billing attribute data 110B comprises billing method data 111 and settlement method data 112. The billing method data 111 is information which is used as the basis for calculating the charge in units of time or a quantity of information. If the content 110A is image stream information, for example, a movie, a charge in units of titles, time or quantities of information may be set. Therefore, billing method data 111 is information indicating, for example, a basic rate for each title or premium or reduction rate in unit of time. That is, billing method data 111 is information with which an adequate or selectable calculation of the charge is performed to be adaptable to the contents or the providing system of the content 110A. A specific structure will be described later. The settlement method data 112 is information with which a charge (fee) settlement process including a payee (the information provider and the person having the copyright). As described later, the billing system 103 performs a settlement process in accordance with settlement method data 112 to communicate information with a settlement institution (a bank or a credit card company (not shown)) connected to the computer network.

The information 110 has a structure with which the content 110A and the billing method data 111 can independently be read. That is, a CPU 122 included in the information providing processor 120 reads the content 110A based on a request from the information storage device 101 to perform the information providing process. A CPU 132 included in the billing processor 130 performs the billing process by reading billing method data 111 in response to the request to perform the billing process.

Although the information 110 basically has a single structure in which the content 110A and billing attribute data 110B form a pair as shown in FIG. 5, the structure is not limited to this. A modification structure as shown in FIG. 6, 7 or 12 may be employed.

FIG. 6 shows an example in which the content 110A of the information A is another information B. That is, the structure is an insertion-type structure. The information B includes a content 1100A and billing attribute data 110B. The billing attribute data 110B of the information A includes charge data for information A and specific data about information B. The charge data includes a charge calculation method, a charge per unit and a settlement method. The specific data includes delegation of payment and information indicating who pay the charge for information B. The billing attribute data 1100B of the information B includes charge data for information B.

FIG. 7 shows a structure in which information A includes plural contents 110A, 111A and 112A. This structure is also an insertion-type structure. The content 110A is information B, the content 111A is information C and the content 112A is information D. The billing attribute data 110B of the information A includes charge data for information A, specific data about information B, specific data about information C and specific data about information D. The information B, C and D respectively include contents 1100A, 1100B and 1100C and billing attribute data 1100B, 1110B and 1120B.

Figure 12:
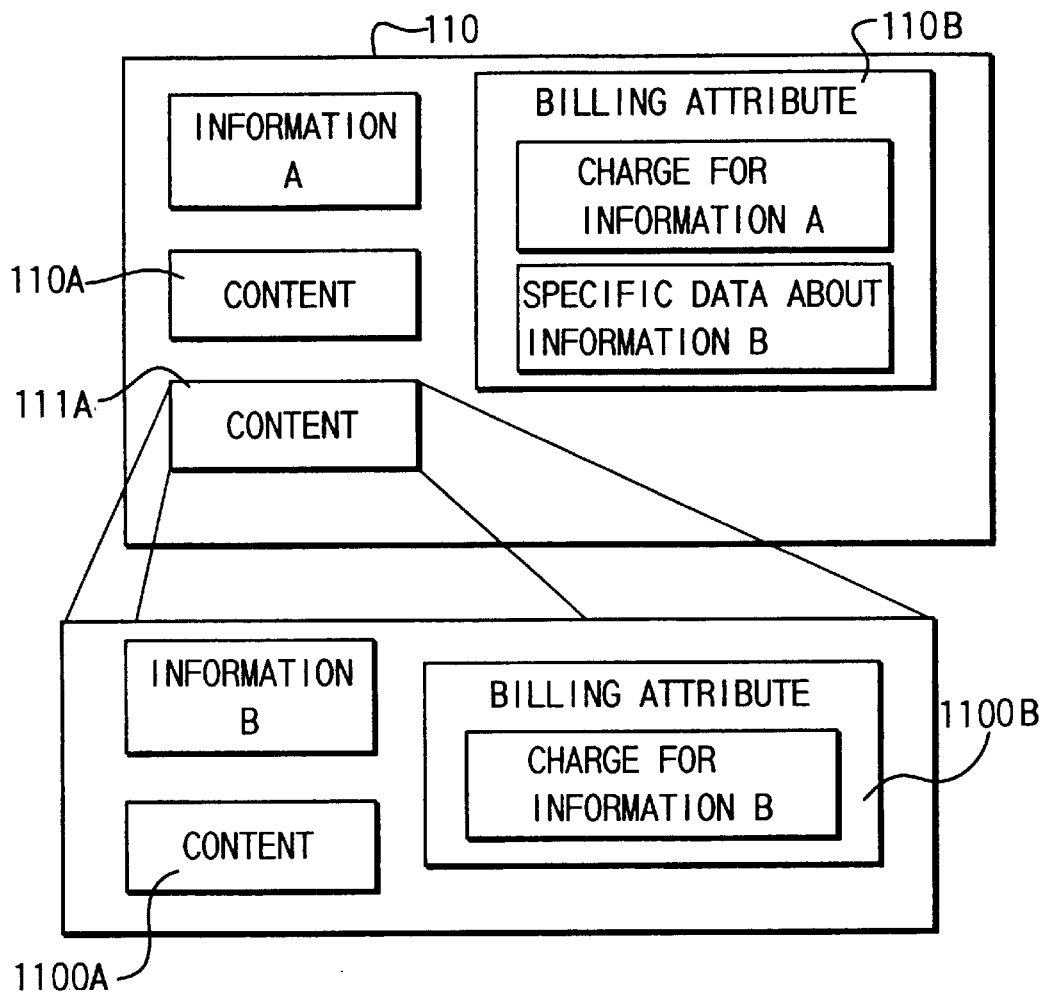
FIG. 12 is a block diagram showing a still another example of information as goods according to the third embodiment.

FIG. 12 shows an information A having two contents 110A and 111A in addition to billing attribute data 110B. The content 111A is an information B as same in the case of FIG. 7. The information B includes content 1100A such as a movie with a certain language voice. The content 110A of the information A may be another language voice for the movie included in the information B. If the user utilizes only the content 111A, he or she can watch movie provided as the information B. If the user utilizes the contents 110A in addition to the content 111A he or she can watch movie with the other language.

Information having an insertion type structure are formed such that a "parent" includes specific data relating to a billing process about "child". Specific data includes parameter information for use when the "parent" (for example, the information A in the case shown in FIG. 6) makes a reference to the "child" (for example, the information B) to determine (1) delegation of payment (a provider of parent or a user), (2) settlement information (a method when payment is performed to the provider of parent) and (3) a state (continuation or interruption) of the billing process for the parent during the reference.

(Structure of Billing System)

As described above, the billing system 103 is mainly divided into the billing processor 130 and the interface module 131. The billing processor 130, as shown in FIG. 8, comprises a data processing module 150, a reading module 151, a charging processing module 152, a settlement processing module 153, a receiving module 154, a reference management module 155 and an output module 156. FIG. 8 shows a specific example of a billing module when the information are in the form of one content without any insertion structure as shown in FIG. 5.

The receiving module 154 receives the billing request from the information providing system 102 to turn on the reference management module 155. The reference management module 155 is an element for controlling execution of the billing process. Specifically, the data processing module 150 is assigned to each of the information and control data supplied from the information providing system 102 is supplied to the data processing module 150. Control data is information of a process of the information providing system 102 to provide information. Specifically, if the information are image information, control data indicates a reproducing process, a provision interruption process or a copying process. If information are in the form of a file, a downloading process or the like is indicated.

The reading module 151 meets a request made from the data processing module 150 to read billing attribute data 110B of requested information to transfer billing attribute data 110B to the data processing module 150. The data processing module 150 has a function for interpreting billing attribute data 110B, a function for determining the contents of the billing process in accordance with billing attribute data 110B, a function for communicating information with the information utilizing system 104 through the interface module 131 and a function for determining the validity of providing information. In accordance with the contents of the billing process, the data processing module 150 controls the charging processing module 152 and the settlement processing module 153 and performs communication of information. In accordance with information communicated with the information utilizing system 104, the data processing module 150 output information indicating allowance of provision (inhibition of provision if provision is invalid) to the information providing system 102 through the output module 156 if the provision of the requested information is valid.

The charging processing module 152 uses the billing method data 111 included in the billing attribute data 110B to perform the charge calculating process for each of information. The settlement processing module 153 performs the settlement process (that is, a process for paying the charge to the requested payee) with respect to the settlement institution in accordance with billing method data 111 included in billing attribute data 110B.

A plurality of the modules for respective functions are provided in the billing system so as to be selected by the data processing module 150, which has interpreted the description of the billing attribute so that the selected function is performed. The modules for the respective functions are, for example, a time charging module, a collective charging module and a credit settlement module. Specifically, the data processing module 150 selects the charging processing module 152 corresponding to the charging method and the settlement processing module 153 corresponding to the settlement method. In a case where the billing system does not provide a proper processing module, a structure may be formed in which a required module is downloaded from a specific server.

(Operation of this Embodiment)

This embodiment is assumed to be formed into an information distribution system in which an information utilizing system 104 (see FIG. 4) and an information transmitting system 171 are connected to each other by a computer network 174, as shown in FIG. 9. The user terminal 104 comprises a receiver device 170 for receiving the content of the information, a personal computer 73 for controlling the whole system of the user terminal 104, and a TV receiver 172 for reproducing image information. As described above, the information transmitting system 171 is assumed to be an integrated system having the information providing system 102, a billing system 103, an information storage device 101 storing information and a transmitter/receiver device 106 corresponding to the interface modules 121 and 131 shown in FIG. 4. Note that the billing system 103 may be provided in the user terminal 104 or it may be independent from both of the information providing system 171 and the user terminal 104.

Referring to a flow chart shown in FIG. 10, the operation of the present invention will now be described.

With the above-mentioned information distribution system, when a user operates the user terminal 104 to make a request to provide a desired information, the information providing system 102 selects the corresponding information 110 from the information storage device 101 which meets the request (steps S1 and S2).

Specifically, the information providing processor 120 of the information providing system 102 retrieves the information 110 including the content 110A which meets the request from the user from the information storage device 101. After the information providing processor 120 has retrieved the desired information 110, the information providing processor 120 requests the billing system 103 to perform the billing process (step S3). Then, the process, which is to be performed by the billing system 103, is performed.

As shown in FIG. 8, the receiving module 154 of the billing system 103 receives the billing processing request from the information providing system 102 so that the receiving module 154 turns on the reference management module 155. The reference management module 155 registers execution of the requested billing process to, for example, a control table, and then assigns the data processing module 150 corresponding to the requested information (step S4). Then, the reference management module 155 supplies control data supplied from the information providing system 102 to the assigned data processing module 150. As control data is information indicating a provision process for reproducing image information, which is the content 110A of the information 110, on a screen of the user terminal 104.

The data processing module 150 reads billing attribute data 110B of the requested information 110 through the reading module 151 (step S5). Specifically, the reading module 151 reads billing attribute data 110B included in the information 110 requested from the information storage device 101 to supply the same to the data processing module 150.

The data processing module 150 uses billing attribute data 110B and control data to perform a predetermined billing process (step S6). Specifically, the data processing module 150 communicates information with the user terminal 104 through the interface module 131. That is, the data processing module 150 presents billing method data 111 and settlement method data 112 described in billing attribute data 110B to the user. As billing method data 111, content of the charge of the content 110A, such as requested image information, for example, a charge for each quantity of information (in unit of title) or a charge for each unit time. Settlement method data 112 is information indicating, for example, the charge settlement method, such as a credit card or transference to a bank.

Then, the user confirms billing method data 111 and settlement method data 112 presented on the screen of the user terminal 104. In this case, the user operates the user terminal 104 to select a selective item (steps S8 and S10) if the selective item exist (steps S7 and S9). For example, if the billing request needs input from the user, the process proceeds to block S8 where data is input from the user. Otherwise, the process proceeds to decision block S9 to determine whether control data needs to be input from the user. If control data needs to be input, processing proceeds to block S10 where control data is input. If not, processing proceeds to decision block S11. Moreover, the user further inputs data indicating whether or not the user approves/disapproves the billing method (steps S11 and S12) and the settlement method (steps S13 and S14). It is assumed that the user approves the charge in the unit of title or selects the settlement method using, for example, a credit card. There sometimes arises a case where the data processing module 150 does not communicate data with the user depending upon the contents of the information or the specification of the system (NO in step S7). That is, the foregoing case is a case where a uniform charge or the settlement method is uniformed to a method, for example, the electronic money. In stead of the method in which the user directly inputs the determination, a method may be employed in which a comparison between previous setting (making of a profile or the like) information performed by the user and a condition specified in accordance with billing attribute data is performed to select the billing system or the settlement method.

In accordance with data (selection and instruction relating to the billing method data 111 and the settlement method data 112) input by the user and the control data, the data processing module 150 determines the charging processing module 152 and the settlement processing module 153 to cause actual process to be performed in accordance with the contents of the billing process (steps S13 and S14). In accordance with data input by the user and control data, the data processing module 150 determines whether or not the provision of information is approved and notifies the result of determination to the information providing system 102 through the output module 156 (steps S11 and S12). That is, if the billing contents cannot be approved by the user as a result of the communication of data with the user, or if the settlement cannot be performed by the settlement method designated by the user, the data processing module 150 notifies inhibition of provision of information (NO in step S11). In this case, the information providing system 102 notifies inhibition of information provision to the user and thus the information providing process is ended.

The determination whether or not provision of information is approved/disapproved corresponds to checking of validity of the billing system or the settlement method. Specifically, inquiry of credit, that of allowable limit which are performed when a credit card is used and inquiry of a balance in an account of a bank, a prepaid card or an electronic purse are included. The determination whether or not the provision of information may be performed by the settlement processing module 153. The settlement processing module 153 notifies a result of the determination to the charging processing module 152 to be used in a determination process for controlling the information provision so as to be within the limit during the calculation of the charge.

If all of the billing contents are satisfied, the data processing module 150 outputs a notice indicating that the provision of information is approved to the information providing system 102 (step S12). When the information providing system 102 receives the approval notice, the information providing system 102 reads the content 110A of the requested information 110 to transmit the content 110A to the user terminal 104 through the interface module (transmitter/receiver device) 106. In accordance with the billing attribute data, the data processing module 150 causes a charge calculation or a settlement process to be, one time, performed at an adequate timing if the billing method is collective billing. If the billing method is the time rate billing, the data processing module 150 turns on the charging processing module 152 and the settlement processing module 153 to wait for control data which is supplied from outside. Then, the data processing module 150 continuously supplies the supplied control data to each of the modules 152 and 153.

In the billing system 103, the charging processing module 152 uses billing method data 111 and control data supplied from the data processing module 150 to calculate a charge which must be sent to the user. Specifically, in accordance with the contents of the charge which can be notified with billing method data 111 corresponding to the billing attribute data 110B of the information 110, the charge in the provision method selected by the user or determined in accordance with control data is calculated. Moreover, the charging processing module 152 calculates the charge at the timing notified from the data processing module 150 in a case where the collective billing is performed. Then, the charging processing module 152 notifies a result of the calculation to the settlement processing module 153. When time rate billing is performed, a process for updating the charge at predetermined intervals in accordance with time information given with clocks supplied from outside is performed. Moreover, the charging processing module 152 also performs interruption of the calculation in accordance with control data supplied from the data processing module 150. In this case, the charging processing module 152 has a function of checking a predetermined limit.

The settlement processing module 153 performs a process for settling the charge calculated by the charging processing module 152 through the data processing module 150. When the settlement method is the method using the credit card requested by the user, a charge request process to the credit card company and payment process to the information provider (the system operator) and the person having the copyright of the information 110, which are payee, are performed. If payment through the bank is performed by the user, a request is made to the bank, which is the settlement institution, to subtract the charge from the account of the bank of the user. Similarly to the charging processing module 152, also the operation of the settlement processing module 153 is changed in accordance with time or control data supplied from outside.

The charge calculation/settlement process, which is performed by the settlement processing module 153 and the charging processing module 152, may continuously be performed during provision of information in a case of, for example, a time billing process. In this case, control of information, which is provided, sometimes affects the billing process. In a case of image information, the billing process must be interrupted if temporary interruption is performed. The billing system is also supplied with information for controlling reproduction of the information as control data. The billing process is ended in accordance with control data (for example, end of provision of the image information) supplied from outside or when a detection is performed that the charge has exceeded a limit during the calculation of the charge.

As described above, according to this embodiment, preparation of billing method data 111 corresponding to the content 110A in the information 110 enables the billing system 103 to use billing method data 111 in response to a request from the information providing system 102 so as to automatically perform the predetermined billing process corresponding to the contents which are provided. In accordance with a result of determination whether or not provision of information is valid made after the billing process is performed by the billing system 103, the information providing system 102 is able to determine whether or not information (the content) is supplied to the user.

Since the billing system 103 calculates the charge and performs the settlement process to provide the information to the user, the charge can automatically and reliably be paid to the information provider and a person having the copyright of the information. Moreover, the user is able to easily confirm the billing contents in accordance with information communicated with the billing system 103. If selective items are provided, the user is able to select a required billing system and the settlement method. Therefore, if a plurality of charging contents are set as the billing methods, the user is able to receive various information providing information in accordance with the content of charging when information is provided for the user. If a time charge is set for one information, the user is able to utilize image information or the like for a required period of time.

Fourth Embodiment

Although the third embodiment has been described about the structure of information including, as billing attribute data 110B, billing method data 111 and settlement method data 112 as shown in FIG. 5, the structure of the information is not limited to this. A program required to perform the billing process may be included in billing attribute data 110B. When the billing attribute data 110B is read, the billing system 103 installs a program for the billing process which forms the so-called data processing module 150 to perform a predetermined billing process corresponding to the information.

If the above-mentioned structure is employed, the data processing module 150 or the like of the billing system 103 is not fixed. During the process for producing the information 110, the program for the billing process may arbitrarily be set. As a result, the contents of the billing process can easily be updated. It is possible to download required function modules from a specific server.

The program required to perform the billing process may be a program described in a billing attribute description language, for example, script language. The data processing module 150 interprets the contents written in the above-mentioned language to determine parameter information required to perform the billing process in accordance with the contents of input and setting performed by the user and a state (time, the load and information of history of use by the user) where the execution is performed. The data processing module 150 turns on the function modules (the settlement processing module 153 and the charging processing module 152) provided for the billing system so that the billing process is performed.

The described contents in the billing attribute language is in the form in which the billing system/settlement method and the parameter (the price and the settlement institution) are directly written, the described contents being used to instruct a function which must be performed by the function module. Moreover, the described contents are used to determine the billing method/settlement method and the parameter (the price and the settlement institution), the content being in the form with which the function module is performed in accordance with a result of interpretation performed by the data processing module 150. Moreover, a program in the execution form for realizing the billing function is added as billing attribute data. In this case, the function modules prepared in the billing system are not used and the program to which the data processing module 150 is added is used to perform the billing process.

Fifth Embodiment

The third embodiment is arranged under assumption that the information 110 have the structure as shown in FIG. 5. Therefore, the billing processing module is provided with only the processing modules (the charge calculating module, the settlement processing module or the like) about the billing attribute of the information A, as shown in FIG. 8. However, the information 110 may have an insertion type structure as shown in FIG. 6. A fifth embodiment is structured to provide information having the insertion type information structure.

Figure 11:
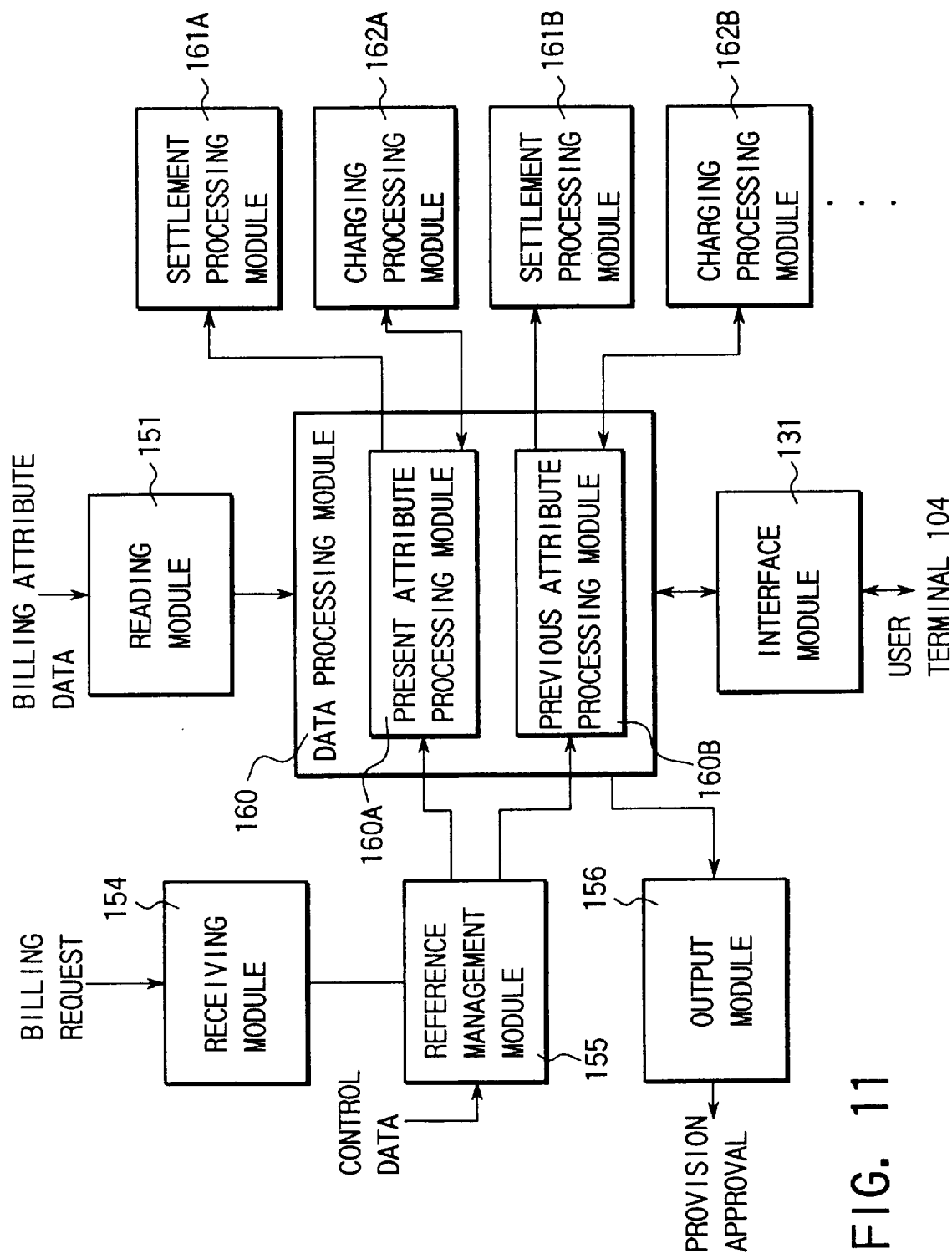
FIG. 11 is a block diagram showing an example of a billing system of a fifth embodiment of the information distribution system according to the present invention.

FIG. 11 is a block diagram showing a billing processing module according to this embodiment.

The billing system is structured such that the reference management module 155 initially assigns an information processing module (called as "previous attribute processing module") 160B for performing the billing process in accordance with billing attribute data 110B of the information A to cause the previous attribute processing module 160B to perform a process. The previous attribute processing module 160B controls a charging processing module 162B and a settlement processing module 161B corresponding to the information A to perform a predetermined calculation process and a settlement process as shown in the flow chart shown in FIG. 10.

When the reference management module 155 receives a request to perform a new billing process for information B included in the information A through the receiving module 154 during the billing process for the information A, the reference management module 155 assigns information processing module (called as "present attribute processing module") 160A for performing the billing process in accordance with the billing attribute data 110B of the information B to the data processing module 160 to cause the present attribute processing module 160A to be performed. The present attribute processing module 160A reads billing attribute data 110B of the information B through the reading module 151 so that a billing process for the content 110A of the information B is performed. That is, the present attribute processing module 160A controls the charging processing module 162A corresponding to the information B and the settlement processing module 161A to perform a predetermined calculation process/settlement process in accordance with the flow chart shown in FIG. 10.

As described above, according to this embodiment, the billing system 103 systematizes the processing modules in accordance with the information structure of the information 110 to perform a billing process suitable for the information 110. Therefore, a billing process can automatically be performed to be adaptable to the provision system of a variety of information providing system 102. Thus, a variety of information providing information can be realized.

Also a billing process can be performed for the information in the form as shown in FIGS. 7 and 12.

An example of the billing system with the described contents of the billing method data 111 included in the billing attribute data 110B will now be described.

General billing methods are "charge free", "billing in unit of time", "billing in unit of information quantity" and "collective or uniform billing". Although "charge free" is free from charge, it is included in the described contents. "Billing in unit of time" is a system in which billing of a predetermined period time is performed and which may be in the form of combination of price and unit time and other variations. For example, the described contents are such that "one dollar for each minute", "one dollar for each minute except for three minutes from start being charge free" or "one dollar for each minute except for fifty cents for each minute after continuous use for one hour".

"Billing in unit of information quantity" is a quantity rate billing system in which billing is performed in, for example, unit of byte in accordance with the quantity of information transferred to a user or the quantity of information stored by the user side. For example, the described contents are such that "one dollar/kbyte" or "one dollar/kbyte except for fifty cents/kbyte in a case of use larger than 1 Mbyte". "Collective or uniform billing" is a billing method which is performed regardless of the period of time or the quantity of information. For example, a broadcast system in which an image stream is continuously provided is adapted to a billing method performed in units of connection of the user terminal 104 to the network. For example, a video-on-demand system is adapted to the described contents such that "five dollars for each movie", "five dollars for each movie except for charge free in a case of watching of 10% or less of the movie" or "five dollars for each downloaded file". In a case of a system, such as an electronic book, the described contents are such that "$XX for each page of the book".

The following specific example is assumed as a combination-type billing system. A system can be considered in which a reduction rate is provided for one type of information. For example, "one dollar for each minute but five dollars for each hour" or "ten dollars for each hour but thirty dollars for a day". The foregoing case is a case in which reduction is provided if provision of information is performed in a large quantity. The foregoing case is a case in which a portion of one package composed of a plurality of contents is provided. For example, music software including several pieces is adapted to described contents, for example, "five dollars for all pieces and one dollar for each piece". In a system, such as an electronic book, a billing system is employed in which a charge for the overall body of information (for example, an encyclopedia) and a charge in information quantity units (for example, a quantity billing system in unit of byte) are set.

A method is available as a general description method of the time/quantity billing system such that a billing parameter is included in the billing attribute data to enable the price and unit of billing to be changed in each time/quantity of information. Then, described contents for a billing system on the basis of time will now be described. Similarly, change of units results in the described contents being formed which includes billing parameters, such as the quantity or page units.

The following billing parameter and change point are described in a case of a billing process which is performed in accordance with a step function or a polygonal line shape function, for example, a step function billing in which "charge free for one minute from beginning, one dollar/minute for 60 minutes following the one minute and fifty cents/minute for the following period". As the billing parameter for the above-mentioned described contents are such that "range=1 min, cost=0 dollar, unit=min". The foregoing "range" means time elapsed from end of the previous range (first start of billing), "cost" means cost in each range and "unit" means billing units in respective ranges. Moreover, "range $" expresses end of billing. A case is considered in which the billing cost is changed from one dollar/minute to fifty cents/minute in accordance with a proportional function until one hour elapses, and then billing of fifty cents/minute is performed. As the billing parameter of the above-mentioned described contents is formed such that "range=1 hour, rate one dollar to fifty cents, unit=min, range=$, cost=fifty cents, unit=min". In this case, "range" means a range, "rate" means change from one dollar to fifty cents in the range and "unit" means billing unit in the range. In the range indicated with "range=$", cost parameter is requested and a fixed charge as fifty cents for each minute is billed.

Another case is considered in which the changing rule of the employed billing parameter is described with a function, an initial value and a limit value. In a case of a step function billing system in which one dollar for each minute are billed in an initial state and the charge for each unit is reduced by twenty cents at intervals of one hour, the following billing parameter is described. Note that twenty cents is made to be a limit in this case. That is, the billing parameter is such that "func=STEP, cost one dollar, range=1 hour, ver=twenty cents, limit=twenty cents, unit=min". In this case, a billing process in accordance with the step function is declared, and the initial charge is one dollar for each minute, the charge for each minute is changed by twenty cents at intervals of one hour and the charge is changed to a lowest charge of twenty cents.

(Specific Example of Settlement Method)

As described above, the settlement method includes credit card, payment through a bank or the electronic money system (a variety of systems are formed). Moreover, a prepaid system and an account subtraction system may be employed.

(Specific Example of Information Distribution System)

The information distribution system which can be applied to the present invention includes a video-on-demand (VOD) system, the electronic newspaper system, various information on Internet and the electronic book system. The VOD system using the billing system according to the present invention enables a pay VOD information to be provided without previous contract between the user's terminal and the video server. The electronic newspaper system adapted to the present invention enables a system to be formed with which an electronic newspaper composed of information including articles, images and audio information can be provided, for example, in each unit or article units. The various information through the Internet adapted to the present invention are able to form a system in which link information, such as a home page, is provided as information and billing and settlement process are performed individually when the linked information (which are individual information) are used to settle the charge to the linked information to requested payee. With the electronic book system, use in page units or article units of, for example, an electronic encyclopedia or an electronic picture book stored in, for example, a CD-ROM can be performed. In this case, a system can be formed in which the charge is paid to a person having the copyright whenever a reference to (copying of) the electronic encyclopedia or the electronic picture book is performed by a user. Also in a case where a plurality of pieces of music, the copyrights of which are owned different persons are treated as one piece of information, a system can be formed in which the charge is paid to each of the person having the copyright of the piece of the music whenever a user uses the information.

As described above, according to the third to fifth embodiments, the information distribution system of a type in which information, such as pay multimedia information is provided for a user is structured such that a billing system prepares billing attribute data corresponding to information content (for example, an image, voice, characters or their combination), which must be provided for the user. Moreover, billing attribute data is, together with content, stored, in the information storage device. In response to a request, billing attribute data corresponding to the information content, which must be provided, is read from the information storage to use the billing attribute data so that a billing process (for example, the charge calculating process and the settlement process) is performed. The billing system comprises, for example, a computer. When the system is used by the information provider employing the information distribution system, the billing process of the information content, which must be provided, can automatically be performed. Moreover, the user is able to automatically detect the contents of billing when the user is provided with the information by using, for example, the user terminal device (such as a personal computer) and a computer communication network system.

When a system is formed in which information is distributed as goods, a variety of billing methods and settlement methods must be provided for each of the information. The information structure having billing attribute data for each of information enables the billing process requiring a complicated and large processing quantity to automatically and efficiently be performed. Therefore, payment of the charge to the person having the copyright of the information and the information provider and appropriate and accurate billing to the user can be performed.

As described above, the information distribution system for providing pay information is arranged such that billing attribute data is prepared for the information to perform the billing process. Thus, an appropriate and efficient billing process corresponding to the contents of the information and the providing system can be performed. Therefore, an appropriate billing system from the user who utilizes the information to the person having the copyright or the provider of the information can be formed and thus the charge can reliably and efficiently be performed. As a result, the billing process, which is an important portion of the information distribution system, can be realized. Thus, the system for distributing information by using a computer and the information communication network can be formed.

In the embodiment shown in FIG. 8, it is necessary to prepare a necessary charging processing modules 152 for each of the charging methods. This is because that the load for preparing an application program is reduced by shifting the charging processing from the application to the platform. However, if the user requests a charging method which is not prepared at the platform, it is necessary to create the new charging processing module 152 for the requested charging method. This necessity of preparing the new charging processing module 152 is eliminated by the following modification.

The billing attribute data is written by a combination of existing basic charging methods. For example, the billing attribute is written such that 1 dollar is needed per one minute during one hour and if thirty dollars are paid after one hour, the information can be freely utilized. The data processing module 150 interprets the billing attribute and selects the charging processing module for a time charge to charge one dollar per one minute. When the data processing module 150 detects that one hour is elapsed from the beginning of utilization of the information, it selects the charging processing module for a collective charge to charge thirty dollars only one time. It is preferable for the user that the data processing module 150 informs the user of changing in the charging method trough the interface module 131 and the user terminal 104.

The basic charging methods may include a time charge, a collective charge (a fee is irrespective of time and quantity of utilization of information), a quantity charge (a fee is based on the quantity of utilization of information) and a free charge. If these basic charging methods are combined and described in the billing attribute, a variety of charging methods can be easily realized without preparing a new charging processing module for a new charging method.

Sixth Embodiment

Figure 13:
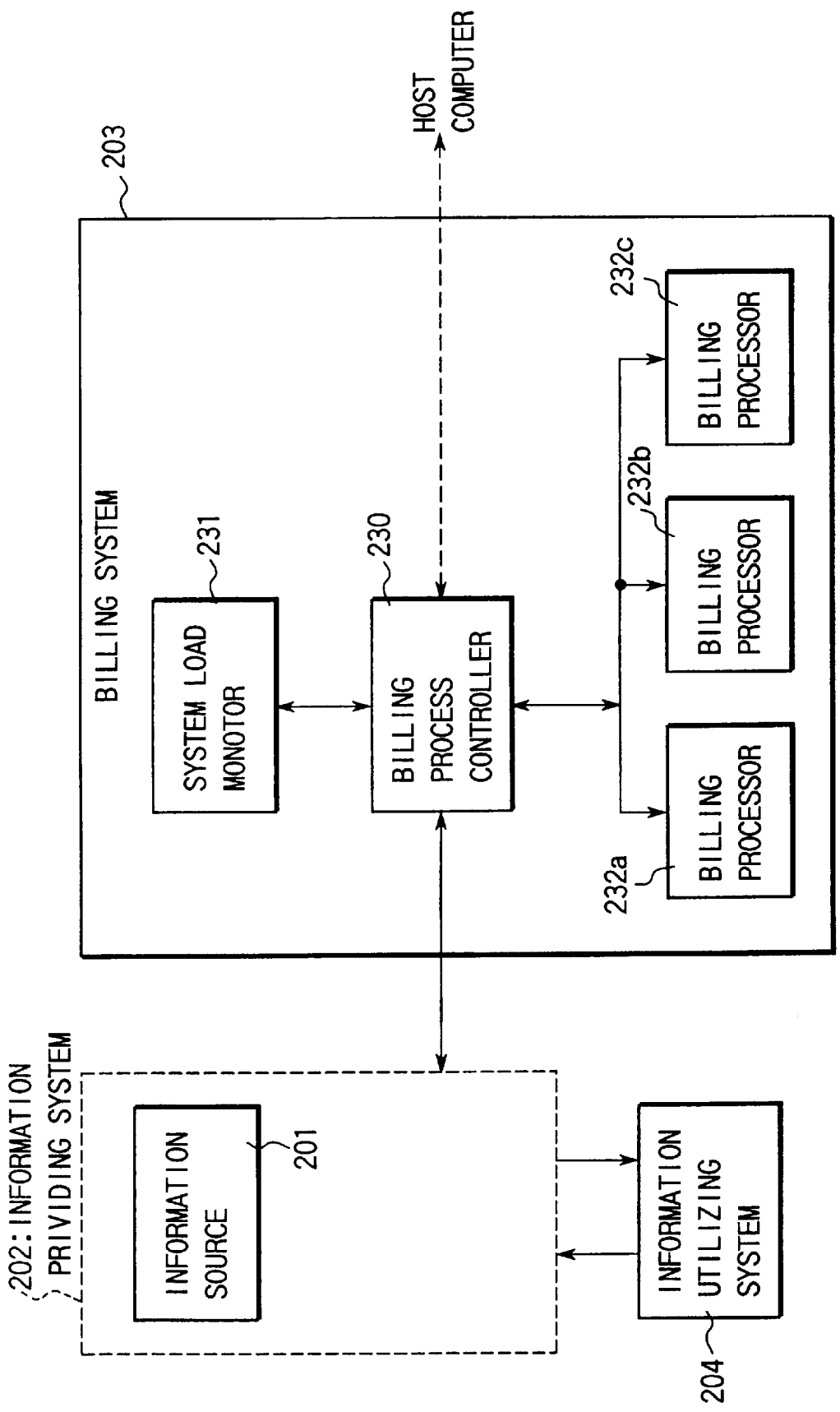
FIG. 13 is a block diagram showing a sixth embodiment of the information distribution system according to the present invention.
Figure 14:
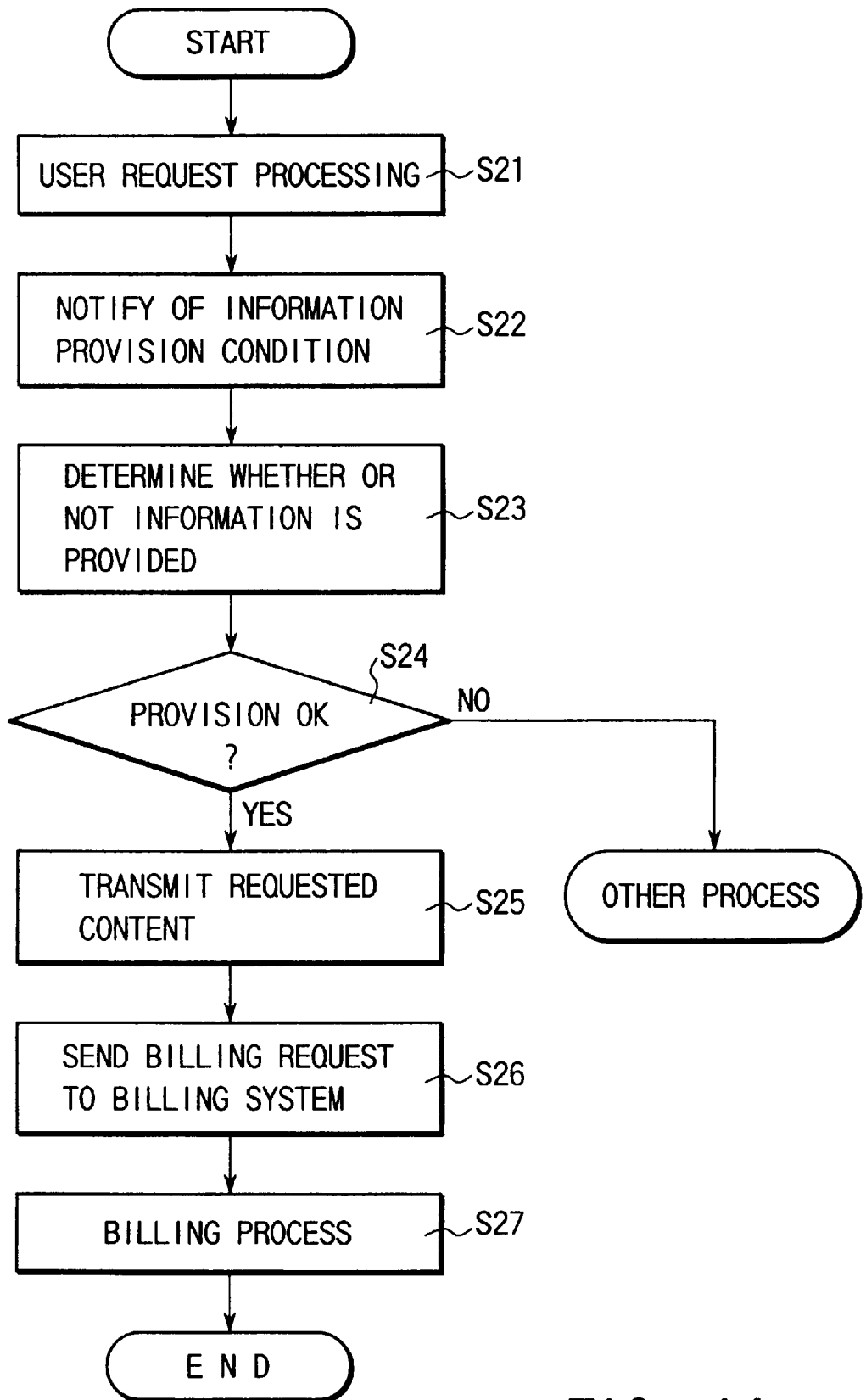
FIG. 14 is a flow chart showing an overall operation of the sixth embodiment according to the present invention.
Figure 15:
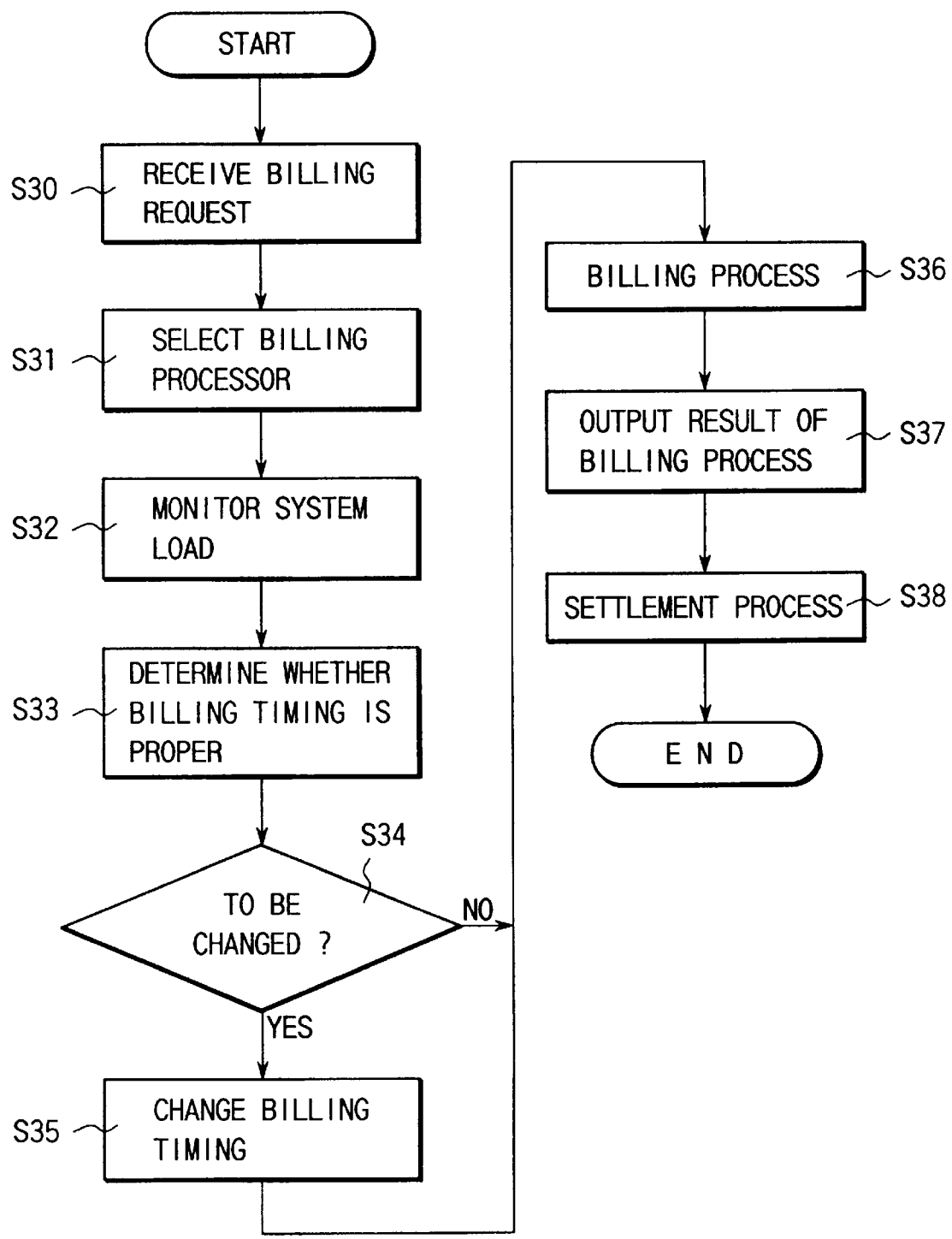
FIG. 15 is a flow chart showing the operation of a billing system according to the sixth embodiment of the present invention.

FIG. 13 is a block diagram showing the structure of a system according to a sixth embodiment of the present invention. FIGS. 14 and 15 are flow charts showing the operation of this embodiment. FIGS. 16A to 16D is a timing chart for explaining the operation and an effect of this embodiment.

(Structure of System)

The system according to this embodiment is an information distribution system using a computer, a computer communication network or a digital broadcast network (a satellite broadcast, satellite communication and cable television included) to provide pay information to a user in response to a request from the user.

As shown in FIG. 13, the system according to this embodiment comprises an information source 201, an information providing system 202, a billing system 203 and an information utilizing system 204. The information source 201 is a large-capacity storage unit in which information which must be provided by the information providing system 202 are stored and correspond to the information storage device 110. Specifically, the information, as described above, include multimedia information, such as image information (combined information including voice) such as a movie, news information (an electronic newspaper or the like) composed of character information and still images and book information (a so-called electronic book) mainly composed of character information.

The information providing system 202 comprises a computer system and communication means for communicating information with the information utilizing system 204. The information providing system 202 has a function for transferring information from the information source 201 to the information utilizing system 204 when a request from a user is made to provide the information. Moreover, the information providing system 202 has an interface for making a request to the billing system 203 to perform the billing process.

The information utilizing system 204 is a personal computer arranged to be operated by the user and having a communication function or an information receiving apparatus having a TV receiver. The information utilizing system 204 has an input device (a keyboard or a mouse) which is operated when provision of information is requested, a display unit and a printing apparatus for outputting provided information. The information utilizing system 204 further comprises a filing apparatus, such as a hard disk drive, for downloading information in the form of a file or software.

Specifically, the billing system 203 comprises hardware and software of the computer system. In this embodiment, the billing system 203 comprises a billing process controller 230, a system load monitor 231 and a plurality of billing processors 232a to 232c. The billing process controller 230 is an element for controlling the overall billing process of the system. The billing process controller 230 has an interface for communicating information with the information providing system 202 and an external host computer. The system load monitor 231 is an element for supervising the load of the system which is generated when the billing process is performed under control of the billing process controller 230. The system load monitor 231 has a function for notifying a state of the load to the billing process controller 230. The billing processors 232a to 232c have individual billing methods and processing timings and serve as elements for performing the actual calculations in the billing process and the transaction process.

(Basic Operation of System)

Referring to the flow chart shown in FIG. 14, the basic operation of the information distribution system according to this embodiment will now be described.

When the information providing system 202 receives a request from the information utilizing system 204 to provide information, the information providing system 202 checks whether or not the requested information are stored in the information source 201. If the information are not stored and the information cannot be provided, the information providing system 202 notifies this to the information utilizing system 204 (step S21). Moreover, the information providing system 202 performs a process for presenting, to the user, conditions required to provide the requested information (step S22). The conditions, which are presented to the user, include the billing method for the information and information about certification of the user. The billing method means, for example, a time billing method charging in unit of time which is adapted to image information, for example, a movie, or a quantity billing method which is adapted to, for example, news information. Since the billing method is presented, the user is able to confirm the charge required to be supplied with the requested information. For example, a cost required to be provided with image information, which requires XX dollars for each minute, for two hours can be confirmed.

The information providing system 202 determines whether or not the information for providing the requested information is performed in accordance with a response from the user with respect to the presented conditions and a result of the user certification process (step S23). That is, the information providing system 202 notifies that provision of the information cannot be performed to the user if the user rejects the presented conditions of the billing system or a result of the certification of the authentication of the user is unsatisfactory (NO in step S24).

On the other hand, the information providing system 202 performs a process for transferring the information extracted from the information source 201 to the information utilizing system 204 if the provision of the requested information is determined (YES in step S24 and step S25). At this time, the information providing system 202 makes a request the billing system 203 (the billing process controller 230) to perform the billing process (step S26). In response to the request to perform the billing process, the billing system 203 performs a predetermined billing process, as described later (step S27).

(Process Which is Performed by Billing System)

Referring to the flow chart shown in FIG. 15 and the timing charts shown in FIGS. 16A to 16D, the operation of the billing system 203 will now be described.

Figure 16:
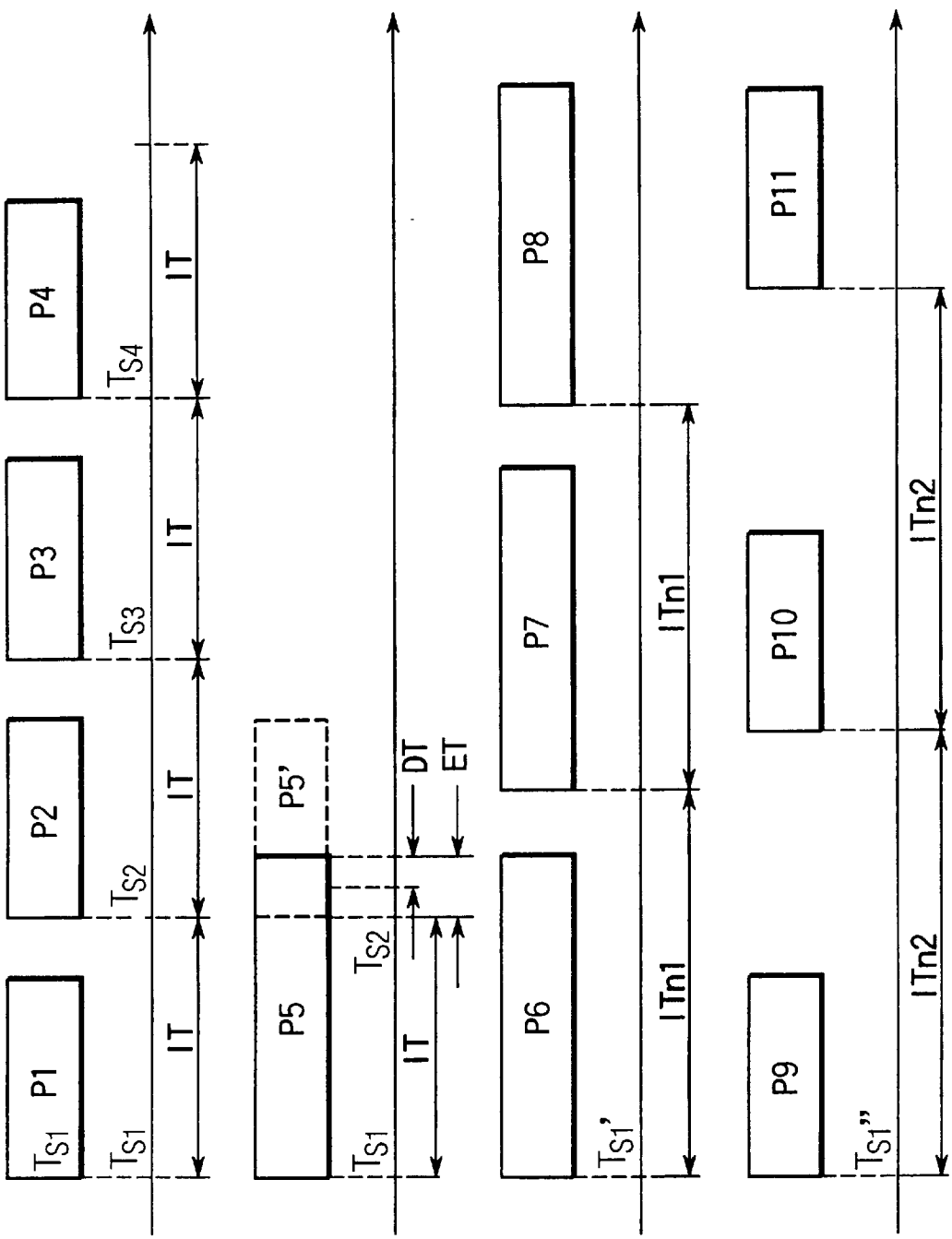
FIGS. 16A to 16D are timing charts showing the operation of the billing system according to the sixth embodiment.

When the billing process controller 230 receives the request to perform the billing process from the information providing system 202, the billing process controller 230 selects a corresponding billing processor from the billing processors 232a to 232c in accordance with the contents of the billing process (which is different from each of information) (steps S30 and S31). The selected billing processor 232a starts performing the billing process in accordance with the billing method set for each of the information and at the processing timing. Specifically, the billing processors 232a to 232c usually start performing billing processes P1 to P4 at predetermined processing timings $T_{S1}$ to $T_{S4}$, as shown in FIG. 16A. The predetermined timings $T_{S1}$ to $T_{S4}$ are determined in such a manner that each of the billing processes P1 to P4 is ended in a predetermined time interval IT. That is, the charge of image information, such as a movie, which is provided for the user is calculated at intervals of IT, which is one minute to store a result of the calculation.

Moreover, the billing process controller 230 makes an inquiry of the system load state to the system load monitor 231 at a predetermined timing after the billing process is started. In addition, the billing process controller 230, at predetermined intervals, detects the system load state under the billing process in accordance with a notification from the system load monitor 231 (step S32). In this embodiment, the system load monitor 231 employs a conventional system arranged to supervise the load state during the information process.

The billing process controller 230 subjects the obtained system load state and a reference value to a comparison to determine whether or not a normal billing process can be performed. Specifically, the billing process controller 230 checks the validity of the timing at which the billing process is performed in accordance with the system load state (step S33). The reference value is a value which is determined in accordance with the information processing performance of the billing system or the source of the same, the reference value being a predetermined value or a value calculated statistically. The reference value may be a limit number of billing processes which can be simultaneously performed (the number varies depending upon the billing system).

If the billing process controller 230 determines that a normal billing process cannot be performed at the present processing timing as a result of a determination of the system load state, the billing process controller 230 changes the timing at which the billing process is performed (YES in step S34 and step S35). If the timing of the billing process is suitable, the billing process is performed as it is and a result of the billing process is output (steps S36 and S37). After the billing process is ended, a charge is calculated with the fraction processed with the original charge unit so that the settlement is performed (step S38).

An example will now be described in which the billing process cannot normally be performed because of a heavy system load with reference to FIG. 16B. For example, the billing process cannot be performed normally in a case where the billing process P5 cannot be ended in the original interval IT and excess time ET takes place. If this state happens, the billing process P5' (a process which starts at timing S2), which must be performed later, is brought to a standby state. The billing process includes a charge calculation process ant a settlement process. If the fact that the previous process P5 has not been completed is detected after completion of charge calculation in a latter billing process, the charge calculation process becomes useless. Moreover, it is necessary to restore the data in various registers to previous data. Therefore, useless processes are performed at every process. Alternately, in a system for checking completion of the previous process P5 before the subject process starts, the checking process must be performed whenever the billing process is performed. As a result, the overall quantity of the billing process is enlarged excessively.

When the billing process controller 230 according to this embodiment determines in step S34 that the billing processing timing is not suitable in accordance with the load state and thus the timing must be changed, the billing process controller 230 sets new interval ITn1 obtained by elongating the interval IT for the original processing timing in such a manner that the billing processes P6 to P8 can be completed in the above-mentioned range, as shown in FIG. 16C. Specifically, the billing process arranged such that a fixed amount/time billing which is performed at intervals of one minute is changed to a process which is performed at intervals of two minutes. Although the charge at each time is doubled, the total charge is not changed as a matter of course. Although there arises a problem in that the interval between the checking processes during the billing process is elongated excessively, the process is considered to be free from an adverse influence because the foregoing problem is limited to only a case where loads of the system are concentrated. The checking process is an inquiry of a balance in the account or an inquiry of a limited sum.

As shown in FIG. 16D, the billing process controller 230 is able to decrease the billing process times which are generated in a predetermined period of time to reduce the overall load for the system by elongating the predetermined interval to interval ITn2 even if each of the billing processes P9 to P11 can be completed in the predetermined interval. As a matter of course, the charge, which is calculated in each of the billing processes, is changed because the interval is elongated. Specifically, the charge is doubled if the interval is elongated to two times.

Although a problem arises in that the interval between the checking processes during the billing process is elongated, the process is not influenced adversely because the elongation is limited to only a case where loads of the system are concentrated.

As described above, according to this embodiment, when the billing process is performed with the billing system to provide information to a user, the processing timing, that is, the intervals of the billing processes are dynamically changed to reduce the load of the system if a determination is performed that the normal billing process cannot be performed in accordance with a state of the load on the system. Thus, if the billing processes are concentrated and the load of the system is enlarged, the load of the system can dynamically be reduced during the billing process. In this case, the interval is changed, and then the processing timing for the billing processing portions, followed by continuing the billing process. As a result, a problem in which the normal billing process cannot be performed because of the enlargement of the system load can be prevented. Thus, a reliable billing process can always be performed. In particular, an information providing information adapted to movies or music having real-time characteristic is able to have a reliable billing process because the load of the system can be reduced if the load of the system is enlarged due to concentration of the billing processes. Therefore, if this embodiment is applied to a system for performing the billing process in a real-time manner, a reliable billing process can always be performed in a proper load state for the system. As a result, an information distribution system for distributing pay information can be realized.

As a method of reducing the load of the system, a method may be employed in which a portion of the billing process is shared by another host computer in addition to the process for changing the processing timing as is employed in this embodiment. Note that the sharing is sometimes denied depending upon the state of process which is being performed by the other host computer.

Seventh Embodiment

The various information are utilized as a single information. It might possible to employ combination of information, that is, federation of information (activity for providing the information using the information distribution system). The "federation" means provision of information which can be seen as a single information but is formed of a combination of plurality information having individual attributes (not limited to the billing attribute). For example, it is assumed that a person having only sound information uses image (a still image) information of another person to provide a new information. Although a user may pay the charge for each of the information providers, the user of the new information may pay the charge to only the person having sound information to prevent complexity. The charge of image information is paid from the owner (the provider of the new information) of sound information to the owner of image information. Therefore, the owner of sound information determines the charge of the new information in consideration of the charge of image information.

The charge of image information is sometimes increased after the charge of the new information is determined. As an alternative to this, the charge of image information is sometimes changed in accordance with the time of use or the like. A plurality of charging methods are considered, for example, charging to correspond to time for use, that corresponding to quantity (bytes) of information, collective charging for each movie and the like. The charging method required by the owner of sound information and that required by image information are sometimes different from each other. Therefore, if reference from sound information to image information is permitted unconditionally (if information are formed into a federation form), the intention of the owner of sound information does not reflect in the federation. In this case, the information provider of the federation information cannot sometimes make a profit.

A seventh embodiment has a function of permitting (permitting federation) after validity of the information federation is determined if a request for a reference is made from a user.

Figure 17:
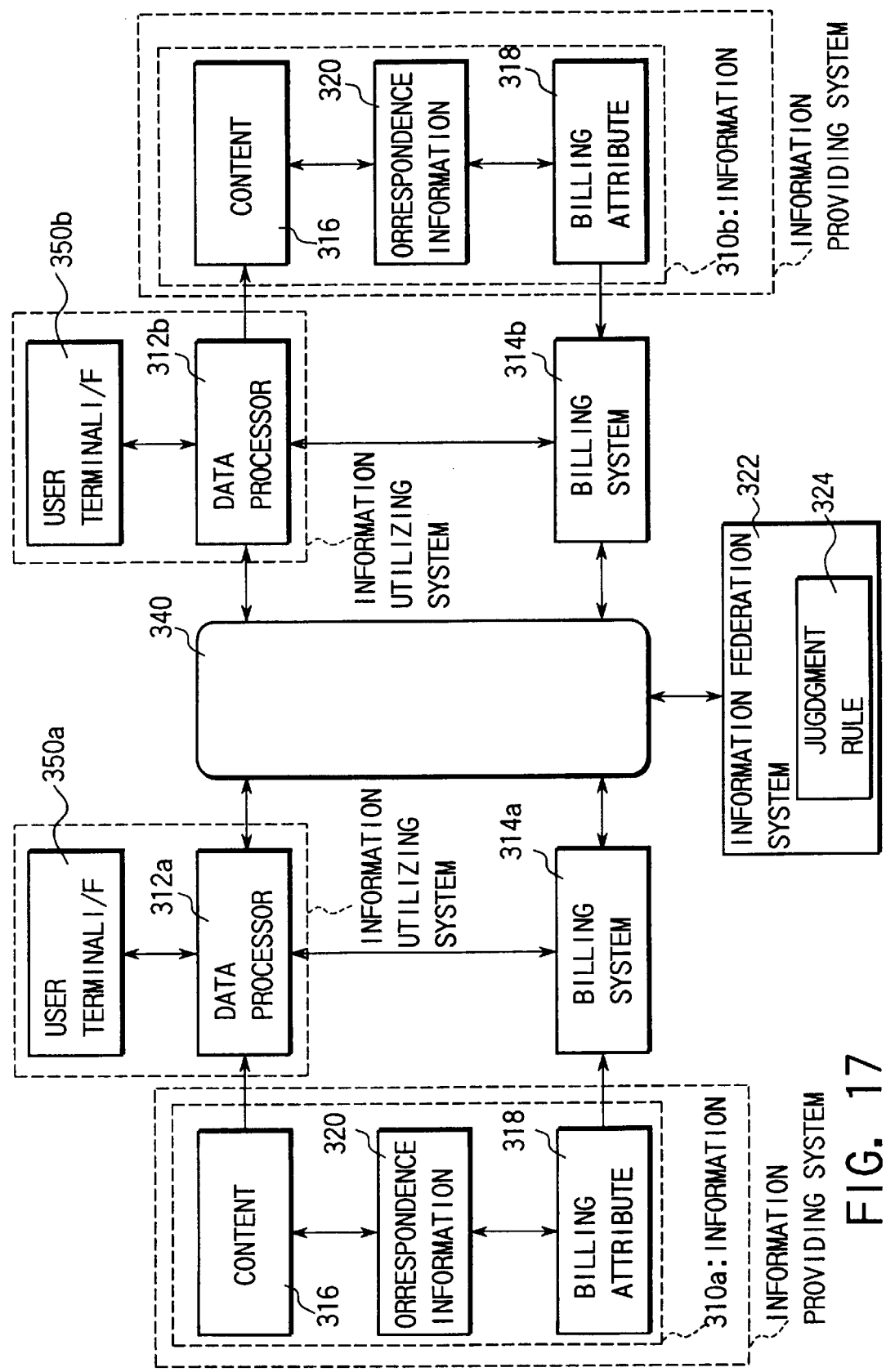
FIG. 17 is a block diagram showing an information distribution system according to the seventh embodiment.

FIG. 17 is a block diagram showing an information distribution system having an information federation function according to the seventh embodiment. Information (multimedia information, movies, music, computer program and the like) 310*a* and 310*b* are connected to data processors 312*a* and 312*b* and billing systems 314*a* and 314*b*. The information 310 is included in information providing system. The data processors 312*a* and 312*b* and the billing systems 314*a* and 314*b* comprise personal computers or work stations. The data systems 312*a* and 312*b* are connected to a computer network 340 to process/use the information 310*b* and 310*b* provided through the computer network 340. The process and use include reproduction (decoding) of information and display of the same. Therefore, user terminals 350*a* and 350*b* having interfaces for use to information of display units, loud speaker units and keyboards are connected to the data processors 312*a* and 312*b*. The data processor 312 and the user terminal 350 are included in an information utilizing system. The data processors 312*a* and 312*b* perform certification of a user before processing or utilizing of information.

Each of information 310*a* and 310*b* has a content 316 of information and a billing attribute 318 in which various billing methods with respect to use of the information are described. Since one information may have a plurality of contents and billing attributes, the information 310 includes a correspondence information table 320 showing the correspondence between content and billing attribute. The content 316 is connected to the data processor 312, while the billing attribute 318 connected to the billing processor 314.

Figure 18:
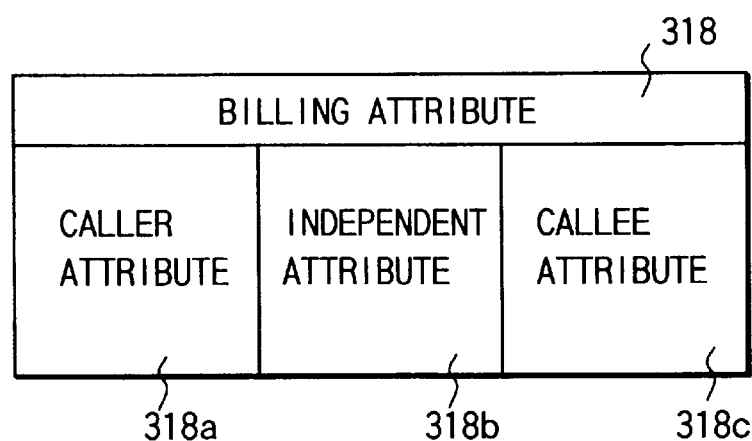
FIG. 18 is a block diagram showing the details of billing attribute data according to the seventh embodiment of the present invention.

The billing attribute according to this embodiment includes a condition which serves as the standard with which whether or not utilization of information is permitted is determined. As shown in FIG. 18, the billing attribute 318 comprises callee attribute 318*a* in which a condition required from a caller to a callee is described, callee attribute 318*c* in which a condition required from the callee to the caller is described and independent attribute 318*b* regardless of the reference.

The data processors 312*a* and 312*b* have, in addition to a function of performing a usual information process (utilization of information), a function of detecting a timing at which the billing process must be performed, for example, detecting start and end of utilization of information, and a function of notifying detected timing data to the billing systems 314*a* and 314*b*. The billing systems 314*a* and 314*b* are previously provided with a billing function for each of the various billing methods. The billing systems 314*a* and 314*b* have a function of selecting a proper billing processing function to correspond to the billing attribute included in the information and a function of performing the selected billing processing function in accordance with timing data supplied from the data processors 312*a* and 312*b*. The billing systems 314*a* and 314*b* perform billing in accordance with the timing data and transmits control data for limiting and controlling utilization of the information in accordance with the billing state (the balance in the user's account or the like) to the data processors 312*a* and 312*b*. Specifically, the billing systems 314*a* and 314*b* calculate the charge for the utilization of information and send this to a settlement institution (not shown). Therefore, also the billing systems 314*a* and 314*b* are connected to the computer network 340 to communicate the amount of billing and balance in the account with a billing server (not shown).

The billing systems 314*a* and 314*b* are connected to an information federation system 322 having a judgment rule memory 324 through the computer network 340. Note that the information federation system 322 may be provided for each information. The billing systems 314*a* and 314*b* transfer, to the information federation system 322, the billing attribute of the information which is being processed by the data processors 312*a* and 312*b* as caller attribute (in a case where the present information is the caller) or the callee attribute (in a case where the present information is callee). The information federation system 322 has a function of receiving billing attribute of the caller billing attribute and billing attribute of the callee information to determine whether or not the two information can be formed into federation in accordance with the judgment rule described in the judgment rule memory 324 when the information are formed into a federation information (or a certain information makes a reference to another information).

Figure 19:
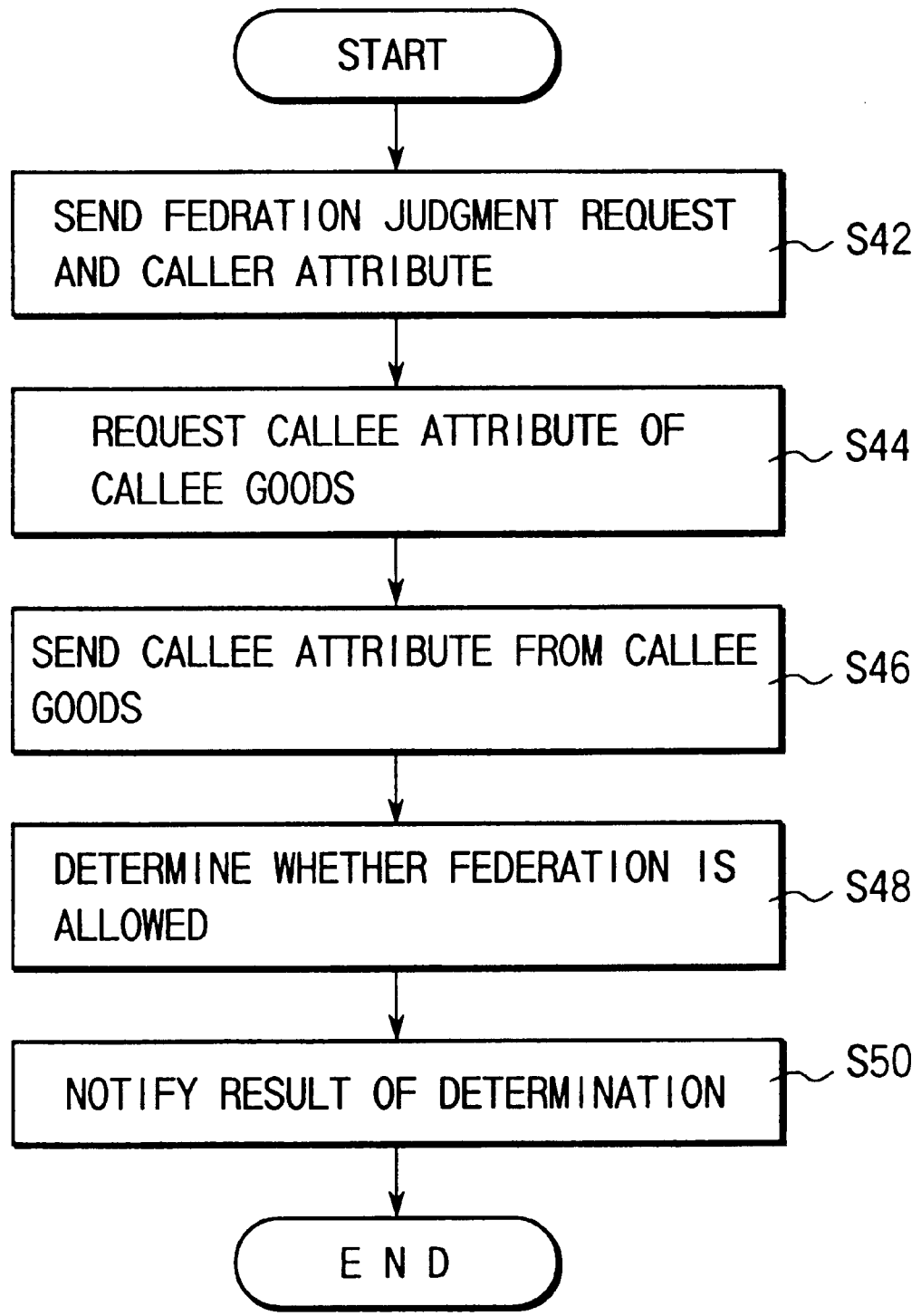
FIG. 19 is a flow chart showing the operation of the seventh embodiment of the present invention.

The operation of this embodiment will now be described with reference to a flow chart shown in FIG. 19. A case will now be described in which the information 301*a* makes a reference request to the caller information 301*b*. In this case, the user terminal 350*b* may be omitted.

When the data processor 312*a* of the caller information detects the request of the reference to the caller information 310*b* during the process of the content 316 of the caller information 310*a*, the billing processor 314*a* transfers, to the information federation system 322, a request to determine the reference of the callee information 310*b*, and transfers, to the information federation system 322, the billing attribute described on the billing attribute 318 as the caller attribute in step S42.

In step S44, the information federation system 322 requests the billing system 314*b* of the callee information 310*b* to supply the callee attribute.

The billing system 314*b* of the callee information 310*b* transmits the billing attribute 318 as the callee attribute in step S46.

In step S48, the information federation system 322 compares the caller attribute of the caller information 310*a* and the callee attribute of the callee information 310*b* so as to determine whether or not federation is permitted in accordance with the judgment rule described on the judgment rule memory 324.

The judgment rule is provided to prevent a problem in that substantially no reference can be permitted if all of the information including attributes which do not coincide with each other are not permitted to be combined. The judgment rule specifies the allowable value of the difference between the two attributes. For example, the caller wants to utilize the callee information with $0.3 or less for each minute, but the callee wants to set the fee of information at $0.8 or more. It is preferable that the reference of information is inhibited in the foregoing case. However, it is sometimes preferable that reference of information is permitted if the difference in attribute is not larger than twenty cents. The attribute includes the settlement method. By using this, whether or not the caller and callee attributes coincide with each other can be determined.

In step S50, the information federation system 322 transfers a result of determination whether or not federation is permitted to the data processor 312*a* of the information 310*a*. If the federation is permitted, information of the callee information 310*b* is transferred from the data processor 312*b* to the data processor 312*a* of the caller information 310*a* through the computer network 340. As a result, the caller information 310*a* is able to make a reference to the callee information 310*b* to form the information into federation. If the federation is not permitted, this fact is displayed on the user terminal 350*a* of the caller information 310*a*. Thus, inhibition of the information federation is notified.

As described above, according to the seventh embodiment, the consistency of the billing attribute of the caller and that of the callee are checked before the information are formed into federation, an information federation which is not required by the caller can be prevented.

Although the description has been performed about the billing attribute as the reference for determining whether or not utilization of the information providing information is permitted, a modification may be permitted in which also the consistence of attributes except for billing is checked. That is, a reference attribute memory in which the attribute (the reference attribute) except for billing and required to determine the reference relationship between information may be provided in addition to the billing attribute 318. As the reference attribute, for example, conditions such as, name of the information, the area (the distance)/ date/time at which the information can be provided, delay time in providing the information, the quality of the information, and the quantity of the information, are described. The information federation system 322 receives the billing/reference attribute of the caller information and the billing/reference attribute of the callee information to determine whether or not the federation is permitted in accordance with the judgment rule.

According to the above-mentioned modification, whether or not the information federation is permitted can be checked in consideration of the conditions except for the charge. As a result, an information federation required for the caller information provider can be formed.

Eighth Embodiment

Figure 20:
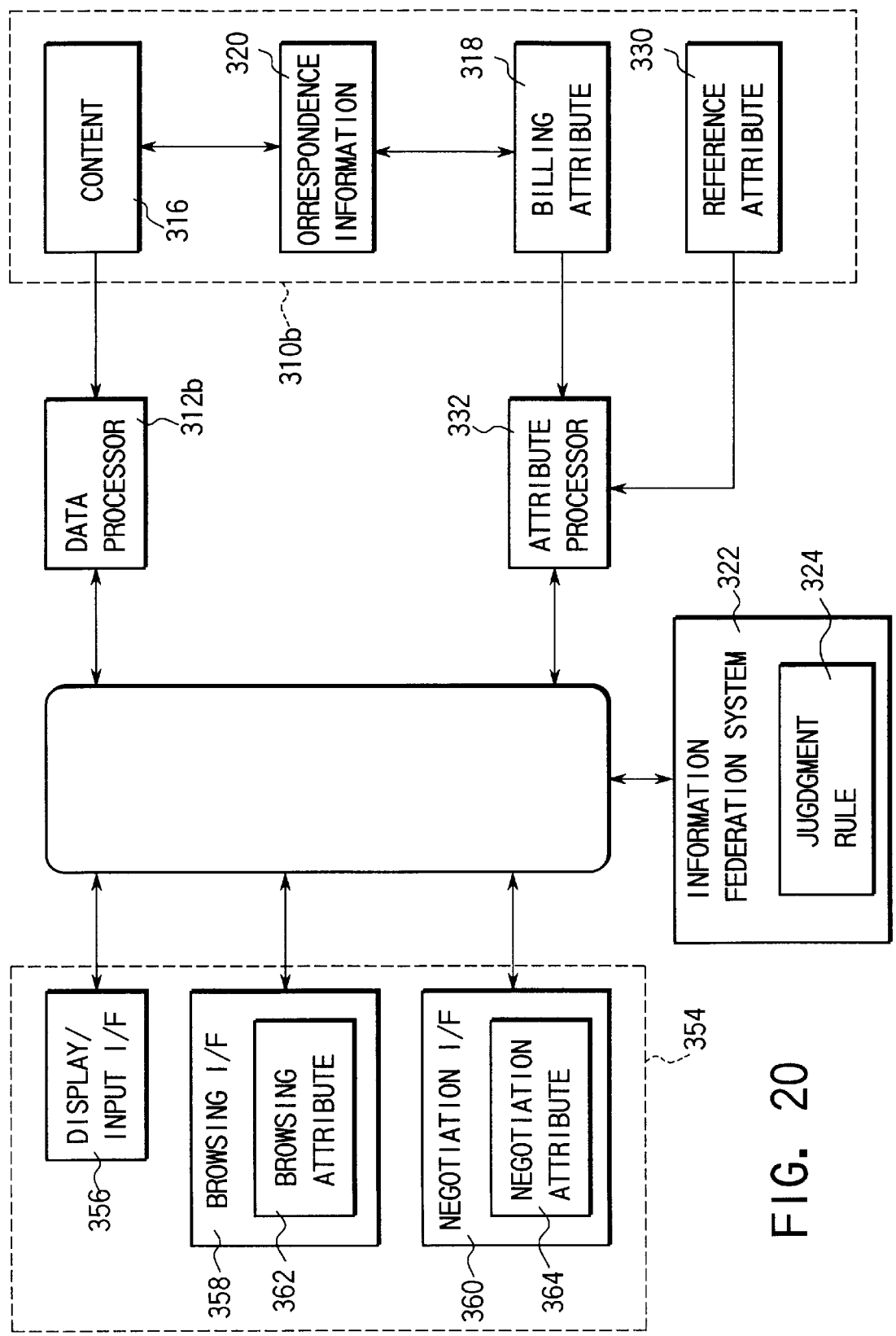
FIG. 20 is a block diagram showing an eighth embodiment of the information distribution system according to the present invention.

FIG. 20 is a diagram showing an eighth embodiment. Although the seventh embodiment relates to the interface between two information, the eighth embodiment relates to a user interface in a case where the caller is a user in stead of the information.

The eighth embodiment has a structure such that a user interface 354 is connected in stead of the caller information 310*a* according to the seventh embodiment shown in FIG. 17. A user interface 354 comprises a display/input I/F 356, a browsing I/F 358 and a negotiation I/F 360.

A callee information 310*b* has reference attribute 330 as well as the billing attribute 318 described in the modification of the seventh embodiment. Therefore, an attribute processor 332 is provided in stead of the billing system 314*b*. The billing attribute 318 and the reference attribute 330 are supplied to the attribute processor 332.

The browsing I/F 358 includes browsing attribute 362 equivalent to the caller attribute in the reference attribute 330, while the negotiation I/F 360 includes billing negotiation attribute 364 equivalent to the caller at in the billing attribute 318. The attributes 362 and 364 are descriptions of required conditions for a required information (the callee information) and permitted to be set and changed when an input is made from a user.

Therefore, the process, which must be performed by the information federation system 322, may be the same as that according to the seventh embodiment regardless of a fact whether the caller is the information or the user. If a plurality of information, to which a reference can be made, exist, or if a reference cannot be made, it is preferable that a list of the information, to which a reference can be made, or a list of a next candidate information is displayed to permit a user to select an information.

According to the eighth embodiment, the user is able to retrieve the information in accordance with the charge, the contents and the usage conditions when a reference to the callee information is made. Therefore, the charge, the conditions and the like can automatically be negotiated.

The eighth embodiment may be modified such that negotiation is performed about the billing attribute similarly to the seventh embodiment shown in FIG. 17. That is, the browsing I/F 358 and the reference attribute 330 may be omitted.

Although the seventh and eighth embodiments have the structure in which only one information is provided from the callee, the seventh and eighth embodiments may be modified such that one of a plurality of information, which can be provided from the callee information, is automatically selected to form the information into federation and provide the same if the callee information is able to provide the plural information. In a case where the attribute of the caller information or the attribute from the user interface is "quality is B or better, charge is A or smaller, domestic information and shortest time delay" when the callee information provides three types of information, information 1 (quality A and charge A), information 2 (quality B and charge B) and information 3 (quality C and charge C), the information federation system 322 selects information 2 in accordance with the rule.

Although the seventh and eighth embodiments have the structure in which the callee information is specified, the callee information is not required to be specified. That is, the information federation system 322 may select an information from a plurality of information that most satisfactorily coincide with the attribute of the caller information or that from the user interface to provide the selected information to the caller information or the user interface.

As described above, according to the present invention, the information distribution system capable of easily realizing a variety of billing systems and the billing system for utilization in the information distribution system can be provided.

According to the present invention, the information distribution system capable of realizing an appropriate and efficient billing process to be adaptable to the content of the information and the provision system and the billing system for use in the information distribution system can be formed.

According to the present invention, only another data processing function is required to be prepared when another application program is used. Therefore, the information distribution system which does not requires another billing processing function and the billing system for use in the information distribution system can be provided.

According to the present invention, information, such as a movie or a music having a real-time characteristic, is provided with a billing system which supervises the system load state occurring due to concentration of billing processes and realizing a reliable billing process always under an appropriate load state and the information distribution system which uses the billing system.

According to the present invention, an information federation system can be provided which determines whether or not a reference can be made when information are formed into federation to selectively permit the reference.

According to the present invention, an information federation device can be provided which retrieves information in accordance with the contents and usage conditions and which enables an optimum information to automatically be used. The embodiments of the invention in which an exclusive property or privilege is claimed are defined as follows.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information distribution system comprising:
   information processing means for performing a utilization process on information supplied from an information source; and
   billing means for performing a billing process to be adaptable to the utilization process performed by said information processing means, wherein
      said information processing means comprises means for detecting a timing required for said billing means to perform the billing process and means for supplying detected timing data to said billing means,
      said billing means comprises means for performing the billing process in response to the timing data supplied from said information processing means,
      said information processing means is implemented by an application program, and
      said billing means is implemented by an operating system on which the application program runs.

2. A system according to claim 1, in which said billing means comprises plural program modules corresponding to plural billing processes and means for selecting a program module from the plural program modules in accordance with a billing attribute data of information which is being processed by said information processing means.

3. A system according to claim 1, in which said information processing means comprises plural program modules corresponding to plural utilization processes and means for selecting a program module from the plural program modules in accordance with a type of the information which is to be processed by said information processing means.

4. A system according to claim 1, in which said billing means comprises means for supplying, to said information processing means, control data for limiting the utilization process to be performed by said information processing means.

5. An information distribution system for providing information to a requester in response to a request from the requester, comprising:
   means for storing contents of the information and billing attribute data corresponding to the contents;
   information utilizing means for extracting a given content from said storing means in response to the request from the requester and utilizing the given content the information utilizing means being implemented by an application program of the computer; and
   billing means for extracting, from said storing means, billing attribute data corresponding to the given content, performing a predetermined billing process in accordance with extracted billing attribute data, and for permitting or inhibiting an operation of said information utilizing means in accordance with a result of the predetermined billing process the billing means being implemented by an operating system of the computer on which the application program runs.

6. An information distribution system according to claim 5, in which said billing means comprises means for determining a billing process based on an extracted billing attribute data, means for calculating a charge for the given content utilized by said information utilizing means based on a charging method data included in the billing attribute data, and means for performing a settlement process for a calculated charge based on settlement method data included in the billing attribute data.

7. An information distribution system according to claim 5, which further comprises:
   user-side information receiving device having means for receiving the content of information to reproduce the content and input means for making a request to provide the content of the information or perform billing, and in which
      said billing processing means comprises information communication means for receiving the billing processing request input from said user-side information receiving device and causing said user-side information receiving device to present the content of billing obtained by the billing process.

8. A recording medium which is readable by a computer, comprising:

contents of information which can be utilized by an application program of the computer; and billing attribute data which is used in a billing process realized by an operating system of the computer when a content is utilized by the computer, the data being recorded in relation to corresponding content and being able to be reproduced independently from the content.

9. A recording medium according to claim 8, in which said recording medium stores plural types of contents of information and billing attribute data related to each of the contents of the information, and stores information having an information structure with which billing attribute data corresponding to the content of information can independently be read together with the content of information requested by the computer.

10. A recording medium according to claim 8, in which the content of information includes another information formed of the content of information and the billing attribute data, and said recording medium stores billing attribute data corresponding to the content of information, and a content of information having an information structure with which the content of information and billing attribute data corresponding to the content of information can independently be read by the computer and which enables the content of information and billing attribute data to be separated and extracted from the information.

11. A recording medium according to claim 8, in which the contents of information include an image, a voice, a still-image and a text or a combination thereof, and the billing attribute data comprises a charging method data and a charge settlement method data which are determined in unit of content and which enables a billing process including a process of determining a suitable charging method and charge settlement method, a process of charge calculation and a settlement process.

12. A recording medium according to claim 11, in which the billing attribute data includes a program for causing the computer to perform the billing process.

13. A recording medium according to claim 12, in which the billing attribute data is a program described in a billing attribute description language, such as script language, and said recording medium is used to read said program by the computer to interpret the contents of billing attribute data required to perform said billing process.

14. A billing system comprising:

a recording medium for storing contents of information and billing attribute data for use in a billing process for the contents;

means for utilizing a content of the information stored in said recording medium and for reading the billing attribute data corresponding to the content to perform the billing process, the utilizing means being implemented by an application program; and billing processing means for performing a predetermined billing process based on the billing attribute data read by said utilizing means, and for permitting or inhibiting an operation of said utilizing means, the billing processing means being implemented by an operating system on which the application program runs.

15. A billing method adaptable to an information distribution system for supplying information requested by a requester to said requester, said billing method comprising the following steps of:

selecting a content of information among the contents stored in the information recording medium in response to the request from the requester;

reading, from said information recording medium, the billing attribute data corresponding to the content of information which is selected;

performing a billing process including a charge calculating process and a settlement process of a calculated charge by using read billing attribute data and in accordance with a provision form for providing the content of information to the requester; and determining whether or not supply of the selected information to the requester is approved based on a result of the billing process.

16. An information distribution system for providing information to a requester in response to a request from the requester, comprising:

billing means for performing a predetermined billing process for information which is provided for the requester;

means for detecting a load of said billing means performing the predetermined billing process; and control means for controlling said billing means in accordance with the load of said billing means detected by said detecting means in such a manner that the load of said billing means is smaller than a predetermined value.

17. A system according to claim 16, in which said billing means performs the billing process at every predetermined timing from start of provision of information for the requester, and said control means comprises means for delaying the predetermined timing at which the billing process is performed to reduce the load if the load exceeds the predetermined value.

18. A billing method adapted to an information distribution system for providing information to a requester in response to a request from the requester, comprising the following steps of:

performing a predetermined billing process with respect to information which is provided for the requester;

detecting a load of said billing process; and controlling said billing process in accordance with the load detected in such a manner that the load of said billing process is smaller than a predetermined value.

19. An information providing service federation system in which each information providing service primitive comprises attribute data relating to a reference to another information providing service primitive and a calling information providing service primitive makes a reference to a called information providing service primitive, comprising:

means for comparing the attribute data of the calling information providing service primitive and the attribute data of the called information providing service primitive to determine whether or not the called information providing service primitive is permitted to be referred by the calling information providing service primitive; and information providing service federation means for federating the called information providing service primitive and the calling information providing service primitive when said comparing means permits the reference.

20. A system according to claim 19, wherein said called information providing service primitive includes plural contents having different attribute data, and said information providing service federation means compares the attribute data of the calling information providing service primitive and the attribute data of the plural contents of the called information providing service primitive, selects one of contents of the called information providing service primitive which most coincides with the attribute data of the calling information providing service primitive, and federates a selected content and the calling information providing service primitive.

21. A system according to claim 19, wherein said information providing service federation means determines whether or not federation is approved based on a result of comparison between the attribute data of the calling information providing service primitive and the attribute data of the plural contents of the called information providing service primitive and notifies a result of determination.

22. An information providing service federation system in which each information providing service primitive comprises attribute data relating to a reference to another information providing service primitive and a calling information providing service primitive makes a reference to a called information providing service primitive, comprising:

a user interface having attribute data relating to a reference to another information providing service primitive;

means for comparing the attribute data of a calling information providing service primitive or the attribute data of said user interface and the attribute data of a called information providing service primitive to determine whether or not the called information providing service primitive is permitted to be referred by the calling information providing service primitive or said user interface when the calling information providing service primitive or said user interface makes a request to make a reference to the called information providing service primitive; and information providing service federation means for federating the called information providing service primitive and the calling information providing service primitive or the user interface when said comparing means permits the reference.

23. A system according to claim 22, wherein said called information providing service primitive includes plural contents having different attribute data, and said information providing service federation means compares the attribute data of the calling information providing service primitive or the user interface and the attribute data of the plural contents of the called information providing service primitive, selects one of contents of the called information providing service primitive which most coincides with the attribute data of the calling information providing service primitive or the attribute data of the user interface, and federates a selected content and the calling information providing service primitive or the user interface.

24. A system according to claim 22, wherein said information providing service federation means determines whether or not federation is approved based on a result of comparison between the attribute data of the calling information providing service primitive or the user interface and the attribute data of the plural contents of the called information providing service primitive and notifies a result of determination.

25. An information providing service federation system in which each information providing service primitive comprises attribute data relating to a reference to another information providing service primitive and a calling information providing service primitive makes a reference to a called information providing service primitive, comprising:

retrieving means for retrieving an information providing service primitive which most coincides with the attribute data of the calling information providing service primitive from plural information providing service primitives when a request is made from the calling information providing service primitive to make a reference to another information providing service primitive; and information providing service federation means for federating the called information providing service primitive and a retrieved information providing service primitive.

26. An information providing service federation system in which each information providing service primitive comprises attribute data relating to a reference to another information providing service primitive and a calling information providing service primitive makes a reference to a called information providing service primitive, comprising:

a user interface having attribute data relating to a reference to another information providing service primitive;

retrieving means for retrieving an information providing service primitive which most coincides with the attribute data of the calling information providing service primitive from plural information providing service primitives or the attribute data of said user interface when a request is made from the calling information providing service primitive or said user interface to make a reference to another information providing service primitive; and information providing service federation means for federating the called information providing service primitive or said user interface and a retrieved information.

27. A system according to one of claims 19 to 26, wherein the attribute data comprises calling attribute data which is applied when the information providing service primitive calls another information providing service primitive, and called attribute data which is applied when the information providing service primitive is called by another information providing service primitive.

28. A system according to one of claims 19 to 21 and 25, wherein the attribute data comprises billing attribute data including a charge method and a settlement method which are related to information providing service federation, and said comparing means determines whether or not the called information providing service primitive is permitted to be referred by the calling information providing service primitive in consideration of a result of comparison and a predetermined allowable range.

29. A system according to one of claims 19 to 21 and 25, wherein the attribute data comprises any one of date, place, distance, communication delay time, quantity of data and the quality of the information, and said comparing means determines whether or not the the called information providing service primitive is permitted to be referred by the calling information providing service primitive in consideration of a result of the comparison and a predetermined allowable range.

30. A system according to one of claims 22 to 24 and 26, wherein the attribute data comprises billing attribute data including a charge method and a settlement method which are related to information providing service federation, and said comparing means determines whether or not the called information providing service primitive is permitted to be referred by the calling information providing service primitive or said user interface in consideration of a result of comparison and a predetermined allowable range.

31. A system according to one of claims 22 to 24 and 26, wherein the attribute data comprises any one of date, place, distance, communication delay time, quantity of data and the quality of the information, and said comparing means determines whether or not the called information providing service primitive is permitted to be referred by the calling information providing service primitive or said user interface in consideration of a result of the comparison and a predetermined allowable range.

32. A billing system for an information distribution system in which ail information providing service primitive including content and billing attribute data indicating a billing method or methods which are to be applied while the content is used is distributed, the billing system comprising:
plural billing modules for performing different billing methods;
means for interpreting the billing attribute data included in the information providing service primitive which is used by a user to select the billing method or modules corresponding to all interpret result; and
means for activating a billing module or modules corresponding to selected billing module or modules.

33. A billing system according to claim 32, in which said basic billing methods includes a time charge method in which a charge varies in accordance with a period of time when the content is used, a collective charge method in which a charge is determined for each information providing service primitive, a quantity charge method in which a charge varies in accordance with amount of information which is used and a free charge method.

34. An information goods comprising:
a content of goods; and
billing attribute data corresponding to the content, the content including another information lo goods comprising another content of another goods and another billing attribute data corresponding to the other content.

35. The information goods according to claim 34, in which billing attribute data comprises billing method data indicating
a charge in unit of time, goods or a quantity of information and settlement method data indicating a payee of fee.

36. The information goods according to claim 34, in which the billing attribute data includes specific data relating to a billing process about the other information goods, the specific data including delegation of payment, settlement information, and a state of a billing process for the information goods when the information goods refers to the other information goods.

37. A billing method for an information goods according to claim 34, comprising:
a reference management module for assigning an information processing module for performing a billing process in accordance with the billing attribute data of the information goods;
the attribute processing module controlling a charging processing module and a settlement processing module corresponding to the information goods to perform a predetermined calculation process and a settlement process based on the billing attribute data;
when the reference management module receives a request to perform a new billing process for other information goods included in the information goods during the billing process for the information goods, the reference management module assigning another information processing module for performing the billing process in accordance with the other billing attribute data of the other information goods.

* * * * *

UNITED STATES PATENT AND TRADEMARK OFFICE
CERTIFICATE OF CORRECTION

PATENT NO. : 6,119,109
DATED : September 12, 2000
INVENTOR(S) : H. Muratani et al.

It is certified that error appears in the above-identified patent and that said Letters Patent is hereby corrected as shown below:

| COLUMN | LINE | |
|---|---|---|
| 30 (Claim 5, | 47 line 17) | "process the" should read --process, the-- |
| 35 (Claim 32, | 27 line 2) | "ail" should read --an-- |
| 35 (Claim 32, | 37 line 11) | "all" should read --an-- |
| 36 (Claim 34, | 7 line 4) | "information 1o goods" should read --information goods-- |

Signed and Sealed this

Eighth Day of May, 2001

*Attest:*

NICHOLAS P. GODICI

*Attesting Officer*     *Acting Director of the United States Patent and Trademark Office*